(12) United States Patent
Roh et al.

(10) Patent No.: US 12,466,743 B2
(45) Date of Patent: Nov. 11, 2025

(54) LITHIUM TRANSITION METAL OXIDE, POSITIVE ELECTRODE ADDITIVE FOR LITHIUM SECONDARY BATTERY, AND LITHIUM SECONDARY BATTERY COMPRISING THE SAME

(71) Applicant: LG Chem, Ltd., Seoul (KR)

(72) Inventors: Jongmin Roh, Daejeon (KR); Seokhyun Yoon, Daejeon (KR); Yoon Jae Lee, Daejeon (KR); Donghoon Suh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 535 days.

(21) Appl. No.: 17/801,974

(22) PCT Filed: Aug. 17, 2021

(86) PCT No.: PCT/KR2021/010899
§ 371 (c)(1),
(2) Date: Aug. 24, 2022

(87) PCT Pub. No.: WO2022/158672
PCT Pub. Date: Jul. 28, 2022

(65) Prior Publication Data
US 2023/0094905 A1 Mar. 30, 2023

(30) Foreign Application Priority Data
Jan. 22, 2021 (KR) .................. 10-2021-0009337
Aug. 12, 2021 (KR) .................. 10-2021-0106774
(Continued)

(51) Int. Cl.
*C01G 51/82* (2025.01)
*C01G 51/42* (2025.01)
(Continued)

(52) U.S. Cl.
CPC .............. *C01G 51/82* (2025.01); *C01G 51/42* (2013.01); *H01M 4/628* (2013.01);
(Continued)

(58) Field of Classification Search
CPC ....... C01G 51/42; C01G 51/82; H01M 4/628; H01M 2004/028; C01P 2002/54; C01P 2004/61
See application file for complete search history.

(56) References Cited

U.S. PATENT DOCUMENTS

2008/0160414 A1   7/2008   Jitsugiri et al.
2013/0171524 A1   7/2013   Cho et al.
(Continued)

FOREIGN PATENT DOCUMENTS

CN      1893151 A      1/2007
CN    105940528 A      9/2016
(Continued)

OTHER PUBLICATIONS

English translation of KR Publication 2013-0079109, Jul. 2013.*
(Continued)

*Primary Examiner* — Brittany L Raymond
(74) *Attorney, Agent, or Firm* — Lerner David LLP

(57) ABSTRACT

A lithium transition metal oxide which is capable of minimizing a side reaction with an electrolyte, thereby suppressing the generation of gas during charging and discharging of a lithium secondary battery is provided. The lithium transition metal oxide is a lithium cobalt oxide which contains a hetero-element, wherein the hetero-element includes a 4th period transition metal; and at least one selected from the group consisting of a group 2 element, a group 13 element, a group 14 element, a 5th period transition metal, and a 6th period transition metal. The lithium transition metal oxide has a cumulative 50% particle diameter (D50) of 10.0 μm to
(Continued)

25.0 μm and a ratio ($D_{max}/D_{min}$) of a maximum particle diameter ($D_{max}$) to a minimum particle diameter ($D_{min}$) of 10.0 to 60.0 when measured by laser diffraction scattering particle size distribution.

11 Claims, 3 Drawing Sheets

(30) Foreign Application Priority Data

Aug. 12, 2021 (KR) .......................... 10-2021-0106775
Aug. 12, 2021 (KR) .......................... 10-2021-0106776

(51) Int. Cl.
H01M 4/02 (2006.01)
H01M 4/62 (2006.01)
H01M 10/052 (2010.01)
H01M 50/46 (2021.01)

(52) U.S. Cl.
CPC ......... *H01M 10/052* (2013.01); *H01M 50/46* (2021.01); *C01P 2002/54* (2013.01); *C01P 2004/61* (2013.01); *C01P 2006/40* (2013.01); *H01M 2004/028* (2013.01)

(56) References Cited

U.S. PATENT DOCUMENTS

| | | | |
|---|---|---|---|
| 2014/0087262 A1 | 3/2014 | Imahashi et al. | |
| 2015/0372304 A1 | 12/2015 | Hasegawa et al. | |
| 2016/0351905 A1 | 12/2016 | Kawamura et al. | |
| 2019/0036117 A1 | 1/2019 | Liu | |
| 2019/0181445 A1 | 6/2019 | Lee et al. | |
| 2020/0161643 A1* | 5/2020 | Chang ............... | H01M 10/0422 |
| 2021/0408538 A1 | 12/2021 | Aoki et al. | |
| 2022/0181627 A1 | 6/2022 | Park et al. | |

FOREIGN PATENT DOCUMENTS

| | | | |
|---|---|---|---|
| CN | 108199035 A | | 6/2018 |
| CN | 108807860 A | | 11/2018 |
| CN | 109309227 A | | 2/2019 |
| CN | 109713238 A | | 5/2019 |
| CN | 110224114 | * | 9/2019 |
| CN | 110224114 A | | 9/2019 |
| CN | 111162258 A | | 5/2020 |
| JP | 2003068302 A | | 3/2003 |
| JP | 2005026141 A | | 1/2005 |
| JP | 3685109 B2 | | 8/2005 |
| JP | 2008-153017 | * | 7/2008 |
| JP | 2012230898 A | | 11/2012 |
| JP | 2012253009 A | | 12/2012 |
| JP | 2013-118067 A | | 6/2013 |
| JP | WO2014118834 A1 | | 1/2017 |
| JP | WO2015115052 A1 | | 3/2017 |
| JP | 2018095529 A | | 6/2018 |
| JP | 2019061750 A | | 4/2019 |
| JP | 2020123460 A | | 8/2020 |
| KR | 2013-0079109 | * | 7/2013 |
| KR | 20130079109 A | | 7/2013 |
| KR | 20150101181 A | | 9/2015 |
| KR | 101751213 B1 | | 6/2017 |
| KR | 20190059115 A | | 5/2019 |
| KR | 20190064424 A | | 6/2019 |
| KR | 20200066048 A | | 6/2020 |
| WO | 2007102407 A1 | | 9/2007 |
| WO | 2015115052 A1 | | 8/2015 |
| WO | 2018048155 A1 | | 3/2018 |
| WO | 2020110590 A1 | | 6/2020 |

OTHER PUBLICATIONS

English translation of JP Publication 2008-153017, Jul. 2008.*
Zhang, Zhifeng, "The research of structure and doping for Li-ion In battery 3D cathode material", Ningbo Institute of Materials Technology & Engineering Chinese Academy of Sciences, Apr. 2017. 22 pgs.
International Search Report for Application No. PCT/KR2021/010895 mailed Dec. 6, 2021, 2 pages.
International Search Report for Application No. PCT/KR2021/010896 mailed Dec. 1, 2021, 3 pages.
International Search Report for Application No. PCT/KR2021/010899 mailed Dec. 1, 2021, 3 pages.
Extended European Search Report for Application No. 21920110.0 dated Aug. 3, 2023. 7 pgs.
Extended European Search Report for Application No. 21920100.1 dated Aug. 3, 2023. 7 pgs.
Extended European Search Report for Application No. 21920099.5 dated Aug. 3, 2023. 7 pgs.
Noh, Mijung and Cho, Jaephil , "Role of Li6CoO4 Cathode Additive in Li-Ion Cells Containing Low Coulombic Efficiency Anode Material", Journal of The Electrochemical Society , Jul. 20, 2012 , vol. 159, No. 8 , A1329-A1334. 6 pages.
Jie-Nan Zhang et al., Improved electrochemical performances of high voltage LiCoO2 with tungsten doping, Chin. Phys. B vol. 27, No. 8 (Apr. 2018) 088202. 8 pgs.
Yuntao Guo, et al., Bifunctional Li6CoO4 serving as prelithiation reagent and pseudocapacitive electrode for lithium ion capacitors, Journal of Energy Chemistry, vol. 47, (Nov. 2020). 8 pgs.

* cited by examiner

[FIG. 1]
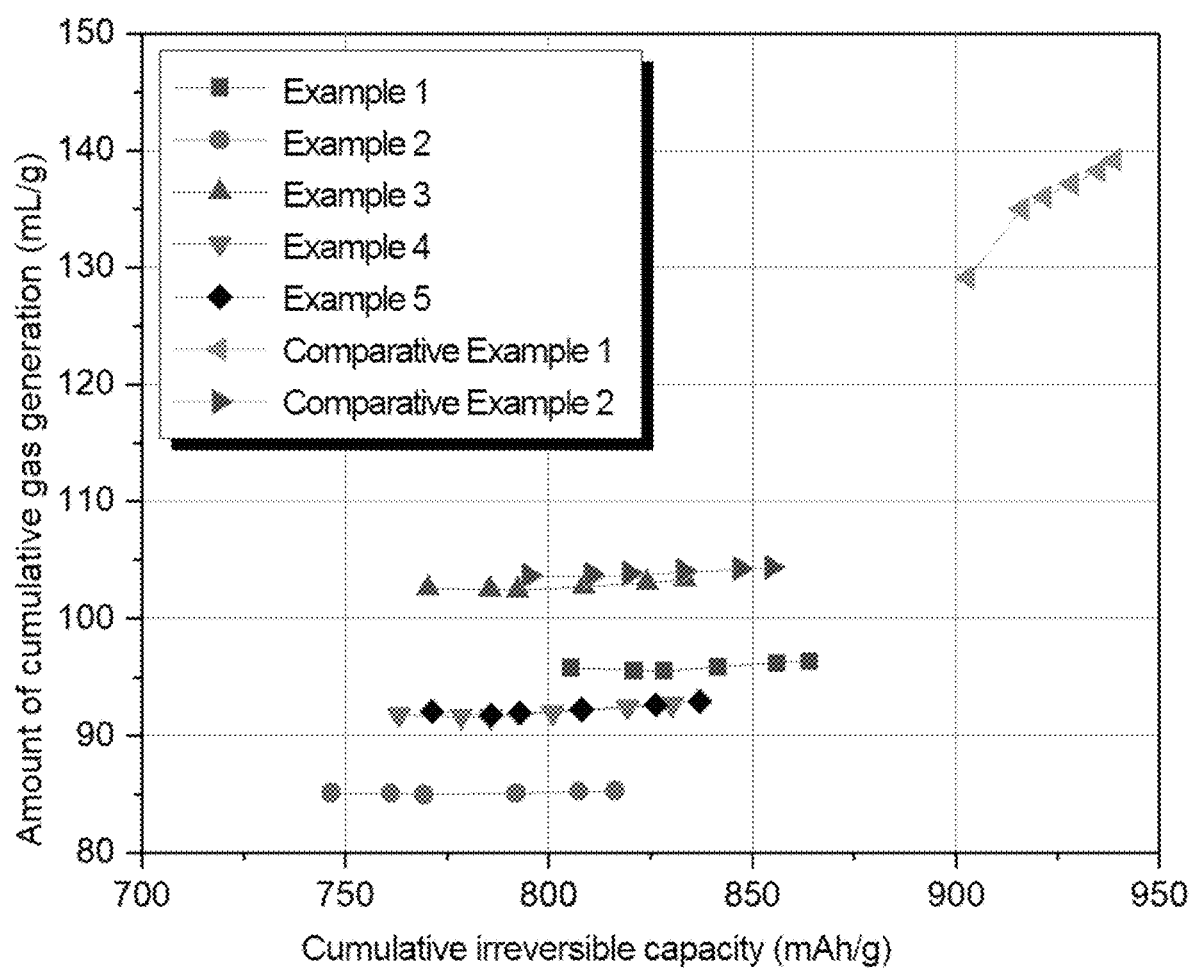

[FIG. 2]
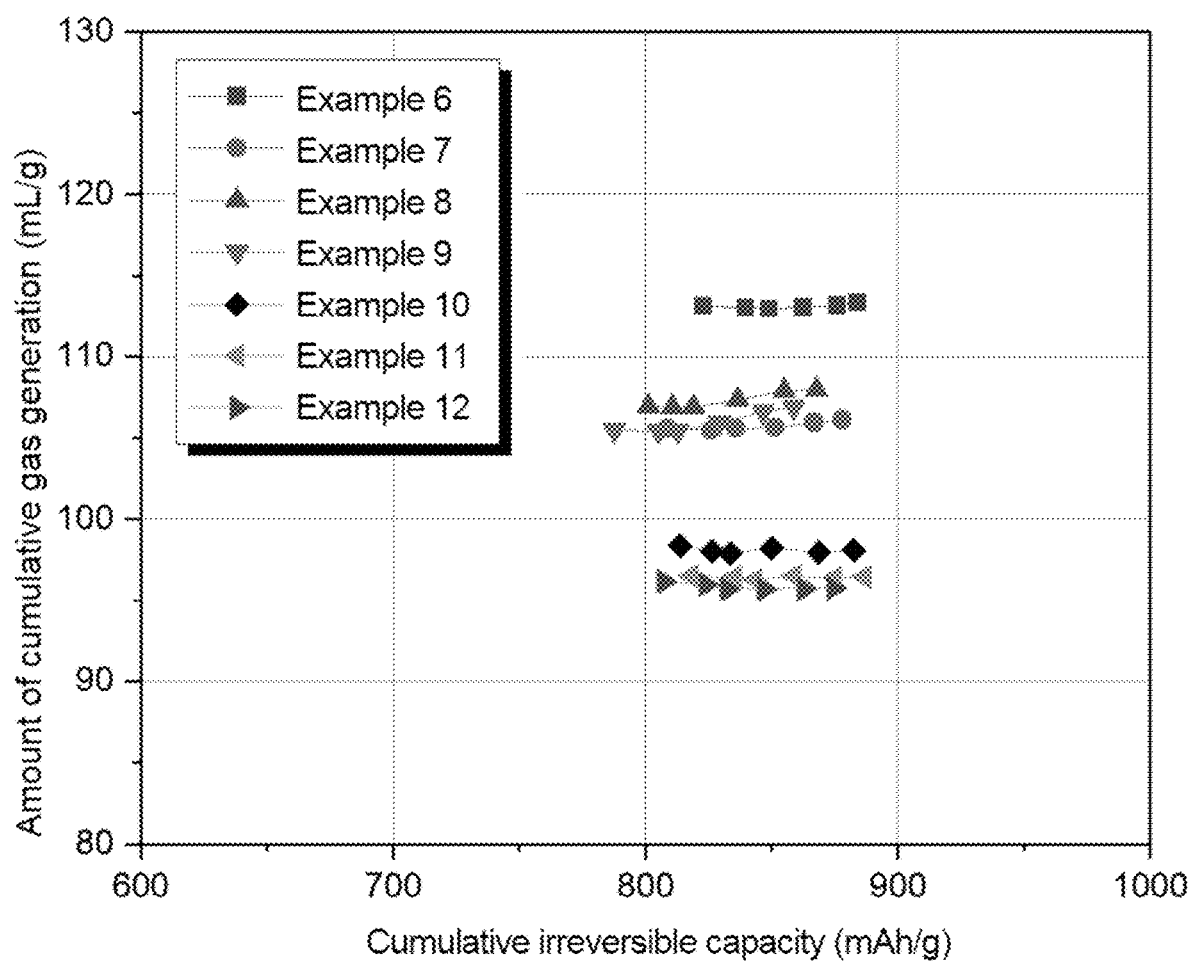

[FIG. 3]
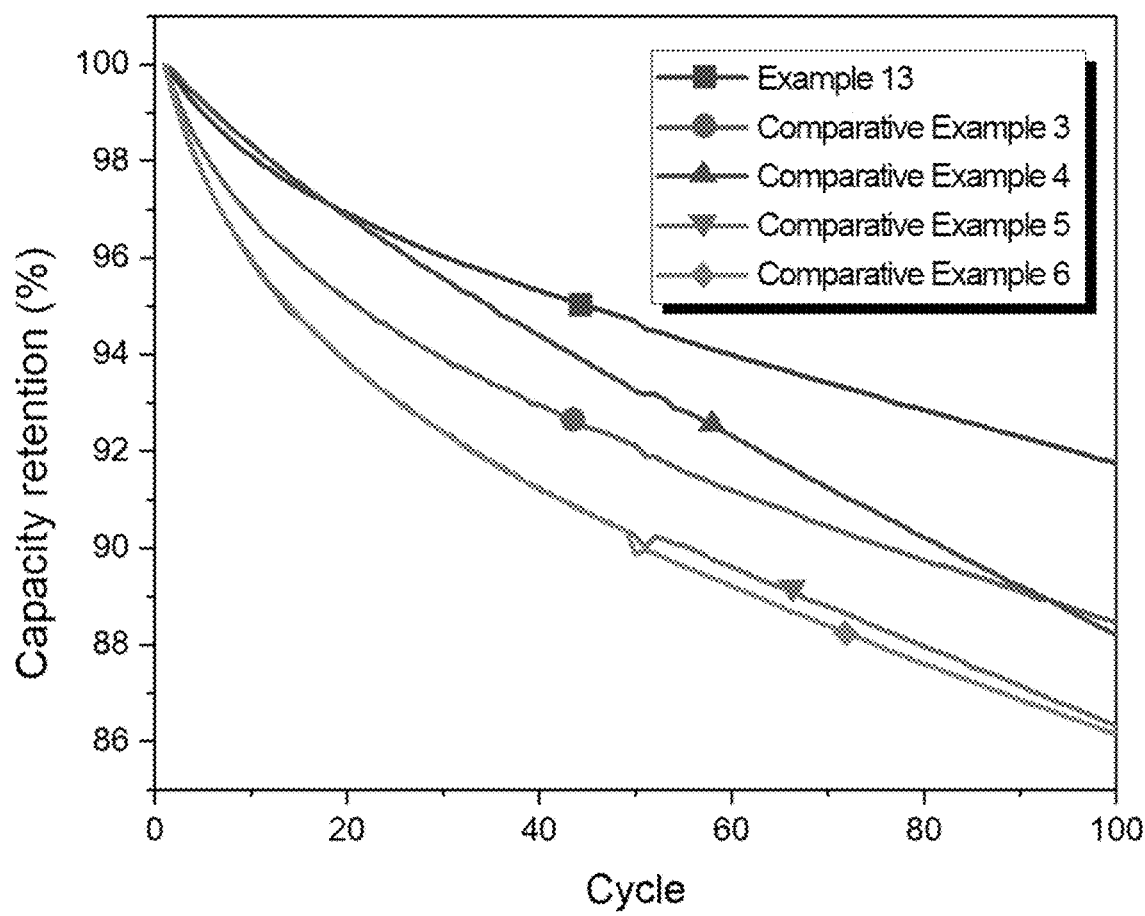

LITHIUM TRANSITION METAL OXIDE, POSITIVE ELECTRODE ADDITIVE FOR LITHIUM SECONDARY BATTERY, AND LITHIUM SECONDARY BATTERY COMPRISING THE SAME

CROSS-REFERENCE TO RELATED APPLICATIONS

This application is a national phase entry under 35 U.S.C. § 371 of International Application No. PCT/KR2021/010899, filed on Aug. 17, 2021, which claims the benefits of Korean Patent Applications No. 10-2021-0009337 filed on Jan. 22, 2021, No. 10-2021-0106774 filed on Aug. 12, 2021, No. 10-2021-0106775 filed on Aug. 12, 2021, and No. 10-2021-0106776 filed on Aug. 12, 2021 with the Korean Intellectual Property Office, the disclosures of which are incorporated herein by reference in its entirety.

TECHNICAL FIELD

The present disclosure relates to a lithium transition metal oxide, a positive electrode additive for a lithium secondary battery, and a lithium secondary battery including the same.

BACKGROUND OF ART

As power consumption increases with the multifunctionalization of electronic devices, many attempts have been made to increase the capacity of a lithium secondary battery and improve charge/discharge efficiency thereof.

As one example, there has been a proposal for a technique, in which a positive electrode active material of at least 80% Ni is applied to a positive electrode of a lithium secondary battery as a positive electrode material, and a metal or metal-based negative electrode active material such as SiO, Si or SiC is applied to a negative electrode along with a carbon-based negative electrode active material such as natural graphite, artificial graphite or the like.

The metal and metal oxide-based negative electrode active material enables a higher capacity than the carbon-based negative electrode active material. However, in the case of the metal and metal oxide-based negative electrode active material, a volume change during charging and discharging is much larger than that of graphite, and thus it is difficult to increase the content of metals and metal oxides in the negative electrode to 15% or more. In addition, when the metals and metal oxides are added into the negative electrode, an irreversible reaction occurs in the initial charge and discharge, and thus the loss of lithium is larger than when a carbon-based negative electrode active material is applied. Thus, when the metal and metal oxide-based negative electrode active material is applied, the amount of lithium lost increases as the capacity of the battery increases, and thus a degree of decrease in the initial capacity also increases.

Accordingly, a study has been conducted on various methods for increasing the capacity of the lithium secondary battery or reducing the irreversible capacity. One of the methods is prelithiation, which is a concept of replenishing lithium consumed in the formation of a solid electrolyte interphase (SEI) layer in an initial state in the battery.

Various methods have been proposed for prelithiation in the battery.

As one example, there is a method of electrochemically lithiating the negative electrode before driving the battery. However, the lithiated negative electrode is very unstable in the atmosphere, and the electrochemical lithiation method is difficult to scale-up the process.

As another example, there is a method of coating the negative electrode with lithium metal or lithium silicide (LixSi) powder. However, the powder has low atmospheric stability due to high reactivity, and thus causing a problem in that it is difficult to establish a suitable solvent and process conditions when coating the negative electrode.

As a prelithiation method in the positive electrode, there is a method of coating with the positive electrode material as much as the amount of lithium consumed in the negative electrode. However, due to the low capacity of the positive electrode material per se, the amount of the added positive electrode material increases, and the energy density and capacity per weight of the final battery decrease as much as the amount of the increased positive electrode material.

Accordingly, a material suitable for prelithiation of the battery in the positive electrode needs to have an irreversible property in which lithium is desorbed at least twice as much as that of a conventional positive electrode material during initial charge of the battery and the material does not react with lithium during subsequent discharge. An additive satisfying the above conditions is referred to as sacrificial positive electrode materials.

A commercial battery is subjected to a formation process in which an electrolyte is injected into a case including a stacked positive electrode, a separator, and a negative electrode, and then a charge/discharge operation is performed for the first time. In this process, an SEI layer formation reaction occurs on the negative electrode, and gas is generated due to the decomposition of the electrolyte. In the formation process, the sacrificial positive electrode material reacts with the electrolyte while releasing lithium and decomposing, and gases such as $N_2$, $O_2$, $CO_2$, etc., generated in the process are recovered through a gas pocket removal process.

As the sacrificial positive electrode material, over-lithiated positive electrode materials, which are lithium-rich metal oxides, are widely used. As the over-lithiated positive electrode materials, $Li_6CoO_4$, $Li_5FeO_4$, $Li_6MnO_4$ and the like, which have an anti-fluorite structure, are well known. In terms of a theoretical capacity, $Li_6CoO_4$ has 977 mAh/g, $Li_5FeO_4$ has 867 mAh/g, and $Li_6MnO_4$ has 1001 mAh/g, which are sufficient for use as a sacrificial positive electrode material. Among the above, $Li_6CoO_4$ has the most excellent electrical conductivity and thus has good electrochemical properties for use as a sacrificial positive electrode material.

$Li_6CoO_4$ is desorbed and decomposed step by step in the formation process, and a crystal phase collapses, and thus $O_2$ gas is inevitably generated in this process. Ideally, $Li_6CoO_4$ should not generate additional gas during the charge/discharge cycle after the formation process. If gas is continuously generated during charging and discharging, the pressure inside the battery increases, and thus a distance between the electrodes may increase and the battery capacity and energy density may decrease. In a severe case, the battery cannot withstand the pressure and may result in an explosion accident.

Thus, there is a need to develop a technology capable of inactivating or stabilizing the final crystal phase of $Li_6CoO_4$ in order not to have an electrochemical activity so that additional gas is not generated during the charge/discharge cycle.

PRIOR ART DOCUMENTS (Patent Document 1) Republic of Korea Patent Publication No. 10-2013-0079109 (2013 Jul. 10)

(Patent Document 2) Republic of Korea Patent Publication No. 10-2020-0066048 (2020 Jun. 9)

DETAILED DESCRIPTION OF THE INVENTION

Technical Problem

There is provided a lithium transition metal oxide capable of suppressing a side reaction with an electrolyte, thereby reducing the generation of gas in a positive electrode of a lithium secondary battery.

In the present disclosure, there is provided a method for preparing the lithium transition metal oxide.

In the present disclosure, there is provided a positive electrode additive for a lithium secondary battery including the lithium transition metal oxide.

In the present disclosure, there is provided a positive electrode for a lithium secondary battery including the lithium transition metal oxide.

In the present disclosure, there is provided a positive electrode for a lithium secondary battery including the positive electrode additive for a lithium secondary battery.

In the present disclosure, there is provided a lithium secondary battery including the positive electrode for a lithium secondary battery.

Technical Solution

According to an embodiment of the present disclosure, there is provided a lithium transition metal oxide, which is a lithium cobalt oxide containing a hetero-element,
   wherein the hetero-element includes a 4th period transition metal; and at least one selected from the group consisting of a group 2 element, a group 13 element, a group 14 element, a 5th period transition metal, and a 6th period transition metal, and
   a cumulative 50% particle diameter (D50) is 10.0 µm to 25.0 µm and a ratio ($D_{max}/D_{min}$) of a maximum particle diameter ($D_{max}$) to a minimum particle diameter ($D_{min}$) is 10.0 to 60.0 when measured by laser diffraction scattering particle size distribution.

According to another embodiment of the present disclosure, there is provided a method for preparing the lithium transition metal oxide, including:
   a first step of solid-state mixing lithium oxide, cobalt oxide and hetero-element oxide; and
   a second step of obtaining the lithium transition metal oxide by calcining the mixture obtained in the first step under an inert atmosphere and at a temperature of 550° C. to 750° C.

According to another embodiment of the present disclosure, there is provided a positive electrode additive for a lithium secondary battery including the lithium transition metal oxide.

According to another embodiment of the present disclosure, there is provided a positive electrode for a lithium secondary battery including a positive electrode active material, a binder, a conductive material, and the lithium transition metal oxide.

According to another embodiment of the present disclosure, there is provided a positive electrode for a lithium secondary battery including a positive electrode active material, a binder, a conductive material, and the positive electrode additive for the lithium secondary battery.

According to another embodiment of the present disclosure, there is provided a lithium secondary battery including the positive electrode for the lithium secondary battery; a negative electrode; a separator; and an electrolyte.

Hereinafter, the lithium transition metal oxide, the method for preparing the lithium transition metal oxide, the positive electrode additive for the lithium secondary battery, the positive electrode for the lithium secondary battery, and the lithium secondary battery according to embodiments of the present invention will be described in more detail.

The terms or words used in the present disclosure and claims should not be construed as being limited to their ordinary or dictionary meanings and should be interpreted as a meaning and concept consistent with the technical idea of the invention based on the principle that the inventors may properly define the concept of the terms in order to best describe their own inventions.

Unless otherwise defined in the present disclosure, all technical and scientific terms have the same meaning as commonly understood by those skilled in the art to which the present invention pertains. The terms used in the description of the present invention is intended for the purpose of effectively describing particular embodiments only and is not intended to limit the present invention.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, components and/or groups.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In the present disclosure, when a positional relationship of two parts is described as, for example, "on ~", "at an upper part of ~", "at a lower part of ~", "next to ~", etc., one or more other parts may be placed between the two parts unless an expression of "immediately" or "directly" is used.

In the present disclosure, when a temporal relationship is described as, for example, "after ~", "following ~", "subsequent to ~", "before ~", etc., cases in which events are not continuous may be included, unless an expression of "immediately" or "directly" is used.

In the present disclosure, it should be understood that the term "at least one" includes all possible combinations from one or more related items.

As used herein, the term "positive electrode additive" may refer to a material having an irreversible property in which lithium is desorbed at least twice as much as that of a conventional positive electrode material during initial charge of the battery and the material does not react with lithium during subsequent discharge. The positive electrode additive may be referred to as sacrificial positive electrode materials. Since the positive electrode additive compensates for the loss of lithium, as a result, the capacity of the battery may be increased by restoring the lost capacity of the battery, and the gas generation may be suppressed to prevent the battery from exploding, thereby improving lifespan and safety of the battery.

As used herein, the term "stabilization of a crystal phase" may refer to suppressing the oxidative property of amorphous $CoO_2$ that occurs after initial charge of a lithium secondary battery including a lithium cobalt oxide-based positive electrode additive into which a hetero-element is introduced. By suppressing the oxidative property of the amorphous $CoO_2$, a side reaction between $CoO_2$ and electrolyte may be prevented to suppress the generation of gas.

I. Lithium Transition Metal Oxide

According to an embodiment of the present disclosure, there is provided a lithium transition metal oxide, which is a lithium cobalt oxide containing a hetero-element, wherein the hetero-element includes a 4th period transition metal; and at least one selected from the group consisting of a group 2 element, a group 13 element, a group 14 element, a 5th period transition metal, and a 6th period transition metal, and a cumulative 50% particle diameter (D50) is 10.0 μm to 25.0 μm and a ratio ($D_{max}/D_{min}$) of a maximum particle diameter ($D_{max}$) to a minimum particle diameter ($D_{min}$) is 10.0 to 60.0 when measured by laser diffraction scattering particle size distribution.

As a result of continuous research by the present inventors, it has been confirmed that a lithium transition metal oxide satisfying the above composition and particle size distribution minimizes a side reaction with an electrolyte to suppress the generation of gas at a positive electrode during charging and discharging of a lithium secondary battery while ensuring excellent battery performance. This is probably because a more stable crystal phase is maintained and the reduction in initial charge capacity is minimized by introducing the hetero-elements of the above composition into the lithium transition metal oxide and satisfying the particle size distribution. Accordingly, the lithium transition metal oxide enables the improvement of safety and lifespan of a lithium secondary battery.

Since the lithium transition metal oxide includes two or more hetero-elements satisfying the above composition, it is possible to stabilize the crystal phase compared to lithium cobalt oxide such as $Li_6CoO_4$. In the present disclosure, the stabilization of the crystal phase refers to suppressing the oxidative property of amorphous $CoO_2$ formed after initial charge of the lithium secondary battery including the lithium cobalt oxide.

In this regard, when the crystal phase of an electrode is checked through X-ray diffraction (XRD) after fully charging the lithium secondary battery including $Li_6CoO_4$, no amorphous pattern tends to appear. In a formation process, in the case of $Li_6CoO_4$, $Co^{2+}$ cations are initially oxidized into $Co^{4+}$ cations, and then $O^{2-}$ anions are oxidized to generate gas. When the charge is completed, a composition of $CoO_2(Co^{4+})$ is obtained without crystallinity, and thus no pattern is observed.

The $Co^{4+}$ cations have a large oxidative property, which is a tendency of $Co^{4+}$ cations to be reduced to $Co^{2+}$ cations or $Co^{3+}$ cations as it is or during discharge (reduction reaction), and thus a side reaction may occur while oxidizing the electrolyte around. Electrolytes such as carbonates are decomposed by the side reaction so as to generate gases such as $CO_2$, CO, and $H_2$. When the charge/discharge cycle proceeds, $Co^{2+}$ cations or $Co^{3+}$ cations, which have been reduced during charge, are oxidized to $Co^{4+}$ cations and the $Co^{4+}$ cations are reduced back to $Co^{2+}$ cations or $Co^{3+}$ cations during discharge, such that gas is continuously generated by the side reaction.

In order to suppress the side reaction, it is necessary to suppress the oxidative property, which is a tendency of $Co^{4+}$ cations to be reduced. For example, there may be a method of stabilizing the oxidation number of $Co^{4+}$ cations by introducing a hetero-element.

In the lithium transition metal oxide, a hetero-element that can have a fixed oxidation number during charging and discharging of the battery is introduced, and thus an effect of lowering an average oxidation number of $Co^{4+}$ cations may be expected. Accordingly, the oxidative property of $Co^{4+}$ cations may be suppressed, and generation of gas caused by the side reaction may be suppressed.

However, as the amount of an introduced hetero-element having a fixed oxidation number during charging and discharging of the battery increases, the initial charge capacity may relatively decrease and the electrical conductivity may tend to decrease. Thus, a 4th period transition metal may be introduced as a main element of the hetero-element together with a sub-element capable of supplementing electrochemical properties of the main element, thereby expressing a stabilizing effect of the crystal phase while securing excellent battery performance.

The lithium transition metal oxide has a composition in which two or more hetero-elements are alloyed or doped into $Li_6CoO_4$.

Herein, the "alloy" means that the hetero-element is introduced in an amount of 10 mol % or more based on the total metal elements excluding lithium in the lithium transition metal oxide. In addition, the "doping" means that the hetero-element is introduced in an amount of less than 10 mol % based on the total metal elements excluding lithium in the lithium transition metal oxide.

The lithium transition metal compound includes a 4th period transition metal as a main element of the hetero-elements.

In addition, the lithium transition metal compound includes at least one element selected from the group consisting of a group 2 element, a group 13 element, a group 14 element, a 5th period transition metal, and a 6th period transition metal as a sub-element of the hetero-elements.

Specifically, the 4th period transition metal includes at least one selected from the group consisting of Sc, Ti, V, Cr, Mn, Fe, Co, Ni, Cu and Zn.

And, the group 2 element includes at least one selected from the group consisting of Mg, Ca, Sr and Ba; the group 13 element includes at least one selected from the group consisting of Al, Ga and In; the group 14 element includes at least one selected from the group consisting of Si, Ge and Sn; the 5th period transition metal includes at least one selected from the group consisting of Y, Zr, Nb, Mo, Tc, Ru, Rh, Pd, Ag and Cd; and the 6th period transition metal includes at least one selected from the group consisting of Lu, Hf, Ta, W, Re, Os, Ir, Pt and Au.

Preferably, in terms of ease of alloying or doping with lithium cobalt oxide and stabilization of the crystal phase, the lithium transition metal compound may include Zn, which is a 4th period transition metal, as the main element of the hetero-elements; and may include at least one element selected from the group consisting of Al, Mg, Ti, Zr, Nb, and W as the sub-element.

Zn, Al, Mg, Ti, Zr, Nb and W may be well substituted at Co sites in the anti-fluorite lattice structure, which is a crystal phase of $Li_6CoO_4$, and the oxidation numbers per se may not change. For example, Zn may have a $Li_6ZnO_4$ crystal phase and easily form an alloy with $Li_6CoO_4$, and an oxidation number thereof may not change from 2+, thereby effectively suppressing the oxidative property of $Co^{4+}$ cations after initial charge.

The hetero-element may be selected in consideration of whether the M may exist in the anti-fluorite lattice structure of lithium cobalt oxide and whether the M has a fixed oxidation number during charging and discharging of the battery.

For example, among the 4th period transition metals, Zn has a $Li_6ZnO_4$ crystal phase, and can easily form an alloy with $Li_6CoO_4$. In addition, the oxidation number does not change at 2+, so that the oxidative property of $Co^{4+}$ cations after initial charge can be effectively suppressed.

As another example, in the case of $Li_5FeO_4$ and $Li_6MnO_4$ that do not satisfy the composition, an anti-fluorite lattice structure may be formed. However, Mn may have a plurality of oxidation numbers of 2+, 3+, 4+, and 7+, and Fe may have a plurality of oxidation numbers of 2+ and 3+. Accordingly, when CoO, MnO, $Fe_2O_3$ and the like, which are raw materials of the lithium cobalt oxide, are mixed and calcined, Mn or Fe may be oxidized and $Co^{2+}$ cations may be reduced to produce $Co^0$, that is, Co metal, which is not an anti-fluorite lattice structure having a single crystal phase. Even if alloyed $Li_6CoO_4$ having a single crystal phase is produced, it may be difficult to suppress the oxidative property of $Co^{4+}$ cations after initial charge because the oxidation number easily changes within the operating voltage in the case of Mn or Fe.

The hetero-element may be included in an amount of 5 mol % to 80 mol % based on the total metal elements excluding lithium in the lithium transition metal oxide.

It is preferable that the content of the hetero-element is 5 mol % or more based on the total metal elements excluding lithium so that the stabilizing effect of the crystal phase may be expressed. However, when an excessive amount of the hetero-element is introduced, the electrical conductivity of the lithium transition metal oxide may be lowered to increase resistance of the electrode and cause poor performance of the battery. Thus, it is preferable that the content of the hetero-element is 80 mol % or less based on the total metal elements excluding lithium.

Specifically, the content of the hetero-element may be 5 mol % or more, 10 mol % or more, or 15 mol % or more; and 80 mol % or less, 70 mol % or less, or 60 mol % or less based on the total metal elements excluding lithium.

Preferably, the content of the hetero-element may be 10 mol % to 80 mol %, 10 mol % to 70 mol %, 15 mol % to 70 mol %, or 15 mol % to 60 mol % based on the total metal elements excluding lithium.

Furthermore, a content ratio of the main element (4th period transition metal) and the sub-element (at least one element selected from the group consisting of a group 2 element, a group 13 element, a group 14 element, a 5th period transition metal, and a 6th period transition metal) may be determined within the content range of the hetero-elements.

For example, the 4th period transition metal among the hetero-elements may be included in an amount of 10 mol % to 70 mol % based on the total metal elements excluding lithium in the lithium transition metal oxide.

It is preferable that the content of the 4th period transition metal in the lithium transition metal oxide is 10 mol % or more based on the total metal elements excluding lithium so that the stabilizing effect of the crystal phase may be expressed. However, when an excessive amount of the hetero-element is introduced, the electrical conductivity of the lithium transition metal oxide may be lowered to increase resistance of the electrode and cause poor performance of the battery. Thus, it is preferable that the content of the 4th period transition metal in the lithium transition metal oxide is 70 mol % or less based on the total metal elements excluding lithium.

Specifically, the content of the 4th period transition metal in the lithium transition metal oxide may be 10 mol % or more, 15 mol % or more, or 20 mol % or more; and 70 mol % or less, 50 mol % or less, or 30 mol % or less based on the total metal elements excluding lithium.

Preferably, the content of the 4th period transition metal in the lithium transition metal oxide may be 10 mol % to 70 mol %, 15 mol % to 70 mol %, 15 mol % to 50 mol %, 20 mol % to 50 mol % or 20 mol % to 30 mol % based on the total metal elements excluding lithium.

The stabilizing effect of the crystal phase of the lithium transition metal oxide may be expected to be proportional to the content of the hetero-element. However, as the amount of an introduced hetero-element such as electrochemically inactive Zn increases, the initial charge capacity may relatively decrease and the electrical conductivity may tend to decrease.

Thus, it is preferable that the content of the sub-element among the hetero-elements is 1 mol % or more based on the total metal elements excluding lithium.

However, when an excessive amount of the hetero-element is introduced, the electrical conductivity of the lithium transition metal oxide may be lowered to increase resistance of the electrode and cause poor performance of the battery. Thus, it is preferable that the content of the sub-element in the lithium transition metal oxide is 20 mol % or less based on the total metal elements excluding lithium.

Specifically, the content of the sub-element in the lithium transition metal oxide may be 1 mol % or more, 2 mol % or more, or 3 mol % or more; and 20 mol % or less, 17 mol % or less, or 15 mol % or less based on the total metal elements excluding lithium.

Preferably, the content of the sub-element in the lithium transition metal oxide may be 1 mol % to 20 mol %, 2 mol % to 20 mol %, 2 mol % to 17 mol %, 3 mol % to 17 mol % or 3 mol % to 15 mol % based on the total metal elements excluding lithium.

The lithium transition metal oxide may be represented by the following Chemical Formula 1:

$$Li_6Co_{1-x-y}Zn_xM_yO_4 \quad \text{[Chemical Formula 1]}$$

in Chemical Formula 1,

M is a group 2 element, a group 13 element, a group 14 element, a 5th period transition metal, or 6th period transition metal, x is 1 to 0.7, and y is 0.01 to 0.2.

Preferably, the M in Chemical Formula 1 may be at least one element selected from the group consisting of Al, Mg, Ti, Zr, Nb, and W.

In Chemical Formula 1, the x is 0.1 to 0.7, and y is 0.01 to 0.2.

Specifically, the x may be 0.1 or more, 0.15 or more, or 0.2 or more; and 0.7 or less, 0.5 or less, or 0.3 or less. Preferably, the x may be 0.1 to 0.7, 0.15 to 0.7, 0.15 to 0.5, 0.2 to 0.5, or 0.2 to 0.3.

The y may be 0.01 or more, 0.02 or more, or 0.03 or more; and 0.2 or less, 0.17 or less, or 0.15 or less. Preferably, the y may be 0.01 to 0.2, 0.02 to 0.2, 0.02 to 0.17, 0.03 to 0.17, or 0.03 to 0.15.

And, in Chemical Formula 1, the x+y value may be 0.05 or more, 0.10 or more, 0.15 or more, 0.20 or more; and 0.80 or less, 0.70 or less, 0.60 or less, or 0.50 or less.

That is, it is preferable that the x+y value is 0.05 or more, 0.10 or more, 0.15 or more, or 0.20 or more in Chemical Formula 1, so that the stabilizing effect of the crystal phase of the lithium transition metal oxide is expressed. However, when the x+y value is too large, the electrical conductivity of the lithium transition metal oxide may be lowered, and thus the performance of the battery may be deteriorated. Therefore, the x+y value in Chemical Formula 1 is preferably 0.80 or less, 0.70 or less, 0.60 or less, or 0.50 or less.

Specifically, in Chemical Formula 1, the x+y value may be 0.05 to 0.80, 0.10 to 0.80, 0.15 to 0.80, 0.15 to 0.70, 0.15 to 0.60, 0.20 to 0.60, or 0.20 to 0.50.

Preferably, the lithium transition metal oxide may include at least one compound selected from the group consisting of $Li_6Co_{0.77}Zn_{0.2}Al_{0.03}O_4$, $Li_6Co_{0.76}Zn_{0.2}Al_{0.04}O_4$, $Li_6Co_{0.75}Zn_{0.2}Al_{0.05}O_4$, $Li_6Co_{0.7}Zn_{0.25}Al_{0.05}O_4$, $Li_6Co_{0.65}Zn_{0.25}Al_{0.1}O_4$, $Li_6Co_{0.67}Zn_{0.3}Al_{0.03}O_4$, $Li_6Co_{0.66}Zn_{0.3}Al_{0.04}O_4$, $Li_6Co_{0.65}Zn_{0.3}Al_{0.05}O_4$, $Li_6Co_{0.6}Zn_{0.3}Al_{0.1}O_4$, $Li_6Co_{0.77}Zn_{0.2}Mg_{0.03}O_4$, $Li_6Co_{0.76}Zn_{0.2}Mg_{0.04}O_4$, $Li_6Co_{0.75}Zn_{0.2}Mg_{0.05}O_4$, $Li_6Co_{0.7}Zn_{0.25}Mg_{0.05}O_4$, $Li_6Co_{0.67}Zn_{0.3}Mg_{0.03}O_4$, $Li_6Co_{0.66}Zn_{0.3}Mg_{0.04}O_4$, $Li_6Co_{0.65}Zn_{0.3}Mg_{0.05}O_4$, $Li_6Co_{0.77}Zn_{0.2}Ti_{0.03}O_4$, $Li_6Co_{0.76}Zn_{0.2}Ti_{0.04}O_4$, $Li_6Co_{0.75}Zn_{0.2}Ti_{0.05}O_4$, $Li_6Co_{0.72}Zn_{0.25}Ti_{0.03}O_4$, $Li_6Co_{0.67}Zn_{0.3}Ti_{0.03}O_4$, $Li_6Co_{0.66}Zn_{0.3}Tio_{0.4}O_4$, $Li_6Co_{0.65}Zn_{0.3}Ti_{0.05}O_4$, $Li_6Co_{0.77}Zn_{0.2}Zr_{0.03}O_4$, $Li_6Co_{0.76}Zn_{0.2}Zr_{0.04}O_4$, $Li_6Co_{0.75}Zn_{0.2}Zr_{0.05}O_4$, $Li_6Co_{0.72}Zn_{0.25}Zr_{0.03}O_4$, $Li_6Co_{0.67}Zn_{0.3}Zr_{0.03}O_4$, $Li_6Co_{0.66}Zn_{0.3}Zr_{0.04}O_4$, $Li_6Co_{0.65}Zn_{0.3}Zr_{0.05}O_4$, $Li_6Co_{0.77}Zn_{0.2}Nb_{0.03}O_4$, $Li_6Co_{0.76}Zn_{0.2}Nb_{0.04}O_4$, $Li_6Co_{0.75}Zn_{0.2}Nb_{0.05}O_4$, $Li_6Co_{0.67}Zn_{0.3}Nb_{0.03}O_4$, $Li_6Co_{0.66}Zn_{0.3}Nb_{0.04}O_4$, $Li_6Co_{0.65}Zn_{0.3}Nb_{0.05}O_4$, $Li_6Co_{0.77}Zn_{0.2}W_{0.03}O_4$, $Li_6Co_{0.76}Zn_{0.2}W_{0.04}O_4$, $Li_6Co_{0.75}Zn_{0.2}W_{0.05}O_4$, $Li_6Co_{0.67}Zn_{0.3}W_{0.03}O_4$, $Li_6Co_{0.66}Zn_{0.3}W_{0.04}O_4$, and $Li_6Co_{0.65}Zn_{0.3}W_{0.05}O_4$.

Meanwhile, the lithium transition metal oxide has a cumulative 50% particle diameter (D50) of 10.0 μm to 25.0 μm and a ratio ($D_{max}/D_{min}$) of a maximum particle diameter ($D_{max}$) to a minimum particle diameter ($D_{min}$) of 10.0 to 60.0 when measured by laser diffraction scattering particle size distribution.

In addition, the lithium transition metal oxide has a cumulative 5% particle diameter (D5) of 3.0 μm to 10.0 μm and a cumulative 95% particle diameter (D95) of 20.0 μm to 45.0 μm when measured by laser diffraction scattering particle size distribution.

The laser diffraction scattering particle size distribution measurement is a method of obtaining a particle size distribution from a diffracted image obtained by dispersing the lithium transition metal oxide in a dispersion medium, irradiating a laser beam thereto, and condensing the generated scattered light (forward scattered light). The laser diffraction scattering particle size distribution measurement is relatively simple and rapid, and can obtain the particle size distribution with excellent accuracy.

Herein, the cumulative 50% particle diameter (D50) refers to a particle diameter when the cumulative percentage reaches 50% from the smallest particle diameter based on mass using a laser diffraction scattering particle size distribution analyzer.

The lithium transition metal oxide has a cumulative 50% particle diameter (D50) of 10.0 μm to 25.0 μm.

It is preferable that the D50 value is 10.0 μm or more in order to prevent a side reaction with the electrolyte from being aggravated due to an excessively large specific surface area. However, when the particle diameter is too large, it is difficult to uniformly coat the positive electrode material including the lithium transition metal oxide on a current collector, thereby causing damage to the current collector during a rolling process after drying. Thus, it is preferable that the D50 value is 25.0 μm or less.

Specifically, the lithium transition metal oxide may have the D50 value of 10.0 μm or more, 10.5 μm or more, 11.0 μm or more, or 11.5 μm or more; and 25.0 μm or less, 24.0 μm or less, 23.0 μm or less, or 22.0 μm or less.

Preferably, the lithium transition metal oxide may have the D50 value of 10.5 μm to 25.0 μm, 10.5 μm to 24.0 μm, 11.0 μm to 24.0 μm, 11.0 μm to 23.0 μm, 11.5 μm to 23.0 23 μm, or 11.5 μm to 22.0 μm.

In addition, the lithium transition metal oxide has a ratio ($D_{max}/D_{min}$) of a maximum particle diameter ($D_{max}$) to a minimum particle diameter ($D_{min}$) of 10.0 to 60.0.

The small $D_{max}/D_{min}$ value is preferred. However, in order to minimize the loss of lithium transition metal oxide and maximize the yield in the process of pulverizing and classifying particles, the $D_{max}/D_{min}$ value is preferably 10.0 or more.

Meanwhile, when the difference between the maximum particle diameter and the minimum particle diameter is too large, the capacity of the particles having a small particle diameter may be excessively expressed, which may cause a serious side reaction with the electrolyte. In addition, the particles having a large particle diameter have a small specific surface area compared to the small particles, and thus a relatively low capacity may be expressed. For this reason, it is impossible to determine average characteristics of the lithium transition metal oxide particles, and thus it is difficult to apply them to a battery, which may not be preferable in terms of reproducibility. Therefore, the $D_{max}/D_{min}$ value is preferably 60.0 or less.

Specifically, the lithium transition metal oxide may have the $D_{max}/D_{min}$ value of 10.0 or more, 11.0 or more, 12.0 or more, 13.0 or more, 14.0 or more, or 15.0 or more; and 60.0 or less, 59.0 or less, 58.0 or less, or 57.0 or less.

Preferably, the lithium transition metal oxide may have the $D_{max}/D_{min}$ value of 11.0 to 60.0, 11.0 to 59.0, 12.0 to 59.0, 12.0 to 58.0, 13.0 to 58.0, 13.0 to 57.0, 14.0 to 57.0, or 15.0 to 57.0.

The lithium transition metal oxide has a maximum particle diameter ($D_{max}$) of 30.0 μm to 90.0 μm and a minimum particle diameter ($D_{min}$) of 1.0 μm to 5.0 μm.

Specifically, the lithium transition metal oxide may have the $D_{max}$ value of 30.0 μm or more, 32.0 μm or more, 34.0 μm or more, 36.0 μm or more, or 38.0 μm or more; and 90.0 μm or less, 89.5 μm or less, 89.0 μm or less, 88.5 μm or less, or 88.0 μm or less. Preferably, the lithium transition metal oxide may have the $D_{max}$ value of 32.0 μm to 90.0 μm, 32.0 μm to 89.5 μm, 34.0 μm to 89.5 μm, 34.0 μm to 89.0 μm, 36.0 μm to 89.0 μm, 36.0 μm to 88.5 μm, 38.0 μm to 88.5 μm, or 38.0 μm to 88.0 μm.

And, the lithium transition metal oxide may have the $D_{min}$ value of 1.0 μm or more, 1.1 μm or more, or 1.2 μm or more; and 5.0 μm or less, 4.5 μm or less, 4.0 μm or less, 3.5 μm or less, or 3.0 μm or less. Preferably, the lithium transition metal oxide may have the $D_{min}$ value of 1.0 μm to 4.5 μm, 1.1 μm to 4.5 μm, 1.1 μm to 4.0 μm, 1.1 μm to 3.5 μm, 1.2 μm to 3.5 μm, or 1.2 μm to 3.0 μm.

Further, the lithium transition metal oxide has a cumulative 5% particle diameter (D5) of 3.0 μm to 10.0 μm and a cumulative 95% particle diameter (D95) of 20.0 μm to 45.0 μm.

Specifically, the lithium transition metal oxide may have the D5 value of 3.0 μm or more, 3.5 μm or more, 4.0 μm or more, 4.5 μm or more, or 5.0 μm or more; and 10.0 μm or less, 9.9 µm or less, or 9.8 µm or less. Preferably, the lithium transition metal oxide may have the D5 value of 3.5 µm to 10.0 µm, 4.0 µm to 10.0 µm, 4.0 µm to 9.9 µm, 4.5 µm to 9.9 µm, 4.5 µm to 9.8 µm, or 5.0 µm to 9.8 µm.

And, the lithium transition metal oxide may have the D95 value of 20.0 µm or more, 20.5 µm or more, or 21.0 µm or more; and 45.0 µm or less, 44.0 µm or less, or 43.0 µm or less. Preferably, the lithium transition metal oxide may have the D95 value of 20.5 µm to 45.0 µm, 20.5 µm to 44.0 µm, 21.0 µm to 44.0 µm, or 21.0 µm to 43.0 µm.

As a non-limiting example, the lithium transition metal oxide may have the $D_{max}$ value of 30.0 µm to 70.0 µm and the $D_{max}/D_{min}$ value of 10.0 to 30.0. The lithium transition metal oxide satisfying the $D_{max}$ value and the $D_{max}/D_{min}$ value may be a compound in which M is a group 13 element in Chemical Formula 1, preferably Al.

The lithium transition metal oxide has a property of irreversibly releasing lithium during charging and discharging of a lithium secondary battery. In particular, the lithium transition metal oxide may suppress a side reaction with an electrolyte, thereby improving safety and lifespan of the lithium secondary battery.

II. Method for Preparing Lithium Transition Metal Oxide

According to another embodiment of the present disclosure, there is provided a method for preparing the lithium transition metal oxide, including:

a first step of solid-state mixing lithium oxide, cobalt oxide and hetero-element oxide; and a second step of obtaining the lithium transition metal oxide by calcining the mixture obtained in the first step under an inert atmosphere and at a temperature of 550° C. to 750° C.

In the above first step, there is provided a raw material mixture including a lithium oxide, a cobalt oxide and a hetero-element oxide.

As the lithium oxide, an oxide containing lithium such as $Li_2O$ may be used without particular limitation.

In addition, as the cobalt oxide, an oxide containing cobalt such as CoO may be used without particular limitation.

Regarding the matters of the hetero-element, refer to the description presented in above "I. Lithium transition metal oxide."

As the hetero-element oxide, an oxide of a 4th period transition metal; and at least one element selected from the group consisting of a group 2 element, a group 13 element, a group 14 element, a 5th period transition metal, and a 6th period transition metal may be used. As a non-limiting example, an oxide containing the hetero-element such as ZnO, MgO, $Al_2O_3$, $TiO_2$, $ZrO_2$, $Nb_2O_5$, and $WO_3$ may be used as the hetero-element oxide without particular limitation.

The raw material mixture is prepared by solid-state mixing the lithium oxide, the cobalt oxide, and the hetero-element oxide to meet a stoichiometric ratio described in above "I. Lithium transition metal oxide."

In the second step, the lithium transition metal oxide is obtained by calcining the raw material mixture obtained in the first step under an inert atmosphere and at a temperature of 550° C. to 750° C.

The second step may be performed under an inert atmosphere formed by using an inert gas such as Ar, $N_2$, Ne, and He.

In the second step, it is preferable that the mixture obtained in the first step is heated at a heating rate of 1.4° C./min to 2.0° C./min under an inert atmosphere so as to reach the calcining temperature.

When the heating rate is too slow, crystal seeds may be slowly formed and crystal growth may be continued, and thus grains may become too large. Thus, it is preferable that the heating rate is 1.4° C./min or more. However, when the heating rate is excessively fast, a large amount of crystal seeds may be generated at a very high rate, and the growth time of grains may be relatively short, and thus crystallinity may be relatively low and grain size may be relatively small. Thus, it is preferable that the heating rate is 2.0° C./min or less.

Specifically, the heating rate may be 1.40° C./min or more, 1.45° C./min or more, or 1.50° C./min or more; and 2.00° C./min or less, 1.95° C./min or less, or 1.90° C./min or less. Preferably, the heating rate may be 1.40° C./min to 2.00° C./min, 1.45° C./min to 2.00° C./min, 1.45° C./min to 1.95° C./min, 1.50° C./min to 1.95° C./min, or 1.50° C./min to 1.90° C./min.

The calcination may be performed at a temperature of 550° C. to 750° C.

It is preferable that the calcination temperature is 550° C. or more so that crystal seeds may be generated at an appropriate rate. However, when the calcination temperature is excessively high, a sintering phenomenon may occur in which the grown crystal grains agglomerate. Thus, it is preferable that the calcination temperature is 750° C. or less.

Specifically, the calcination temperature may be 550° C. or more, 580° C. or more, or 600° C. or more; and 750° C. or less, 720° C. or less, or 700° C. or less. Preferably, the calcination temperature may be 580° C. to 750° C., 580° C. to 720° C., 600° C. to 720° C., or 600° C. to 700° C.

The calcination may be performed for 2 to 20 hours at the calcination temperature. The calcination time may be adjusted in consideration of the time required for a hetero-element to be introduced into the lithium cobalt oxide in the form of an alloy or doping so as to stabilize crystals. Specifically, the calcination time may be 2 hours or more, 3 hours or more, or 4 hours or more; and 20 hours or less, 19 hours or less, or 18 hours or less. Preferably, the calcination time may be 3 to 20 hours, 3 to 19 hours, 4 to 19 hours, or 4 to 18 hours.

The lithium transition metal oxide obtained in the second step may have a cumulative 50% particle diameter (D50) of 10.0 µm to 25.0 µm and a ratio ($D_{max}/D_{min}$) of a maximum particle diameter ($D_{max}$) to a minimum particle diameter ($D_{min}$) of 10.0 to 60.0 when measured by laser diffraction scattering particle size distribution. If necessary, a step of pulverization and classification may be performed so that the lithium transition metal oxide may have the above D50 value within the above range.

Optionally, a step of washing and drying the compound represented by the Chemical Formula 1 obtained in the second step may be performed.

As a non-limiting example, the washing process may be performed by a method of mixing the compound of the Chemical Formula 1 and a washing solution at a weight ratio of 1:2 to 1:10, followed by stirring. Distilled water, ammonia water, etc. may be used as the washing solution. The drying may be performed by a method of heat-treating at a temperature of 100° C. to 200° C. or 100° C. to 180° C. for 1 to 10 hours.

III. Positive Electrode Additive for Lithium Secondary Battery

According to another embodiment of the present disclosure, there is provided a positive electrode additive for a lithium secondary battery including the above lithium transition metal oxide.

The lithium transition metal oxide may minimize a side reaction with an electrolyte so as to suppress gas generation at a positive electrode during charging and discharging of a lithium secondary battery. Thus, the positive electrode additive for the lithium secondary battery including the lithium transition metal oxide may allow improved safety and lifespan of the lithium secondary battery.

The positive electrode additive for the lithium secondary battery including the lithium transition metal oxide has a property of irreversibly releasing lithium during charging and discharging of the lithium secondary battery. Thus, the positive electrode additive for the lithium secondary battery is included in the positive electrode for the lithium secondary battery, and functions as a sacrificial positive electrode material for prelithiation.

Regarding the matters of the lithium transition metal oxide, refer to the description presented in above "I. Lithium transition metal oxide."

The lithium transition metal oxide has a composition in which two or more hetero-elements are alloyed or doped into $Li_6CoO_4$.

The lithium transition metal compound includes a 4th period transition metal as a main element of the hetero-elements.

In addition, the lithium transition metal compound includes at least one element selected from the group consisting of a group 2 element, a group 13 element, a group 14 element, a 5th period transition metal, and a 6th period transition metal as a sub-element of the hetero-elements.

Specifically, the 4th period transition metal includes at least one selected from the group consisting of Sc, Ti, V, Cr, Mn, Fe, Co, Ni, Cu and Zn.

And, the group 2 element includes at least one selected from the group consisting of Mg, Ca, Sr and Ba; the group 13 element includes at least one selected from the group consisting of Al, Ga and In; the group 14 element includes at least one selected from the group consisting of Si, Ge and Sn; the 5th period transition metal includes at least one selected from the group consisting of Y, Zr, Nb, Mo, Tc, Ru, Rh, Pd, Ag and Cd; and the 6th period transition metal includes at least one selected from the group consisting of Lu, Hf, Ta, W, Re, Os, Ir, Pt and Au.

Preferably, in terms of ease of alloying or doping with lithium cobalt oxide and stabilization of the crystal phase, the lithium transition metal compound may include Zn, which is a 4th period transition metal, as the main element of the hetero-elements; and may include at least one element selected from the group consisting of Al, Mg, Ti, Zr, Nb, and W as the sub-element.

The hetero-element may be included in an amount of 5 mol % to 80 mol % based on the total metal elements excluding lithium in the lithium transition metal oxide.

The 4th period transition metal among the hetero-elements may be included in an amount of 10 mol % to 70 mol % based on the total metal elements excluding lithium in the lithium transition metal oxide.

The hetero-element which is at least one selected from the group consisting of a group 2 element, a group 13 element, a group 14 element, a 5th period transition metal, and a 6th period transition metal may be included in an amount of 1 mol % to 20 mol % based on the total metal elements excluding lithium in the lithium transition metal oxide.

The lithium transition metal oxide may be represented by the following Chemical Formula 1:

$$Li_6Co_{1-x-y}Zn_xM_yO_4 \quad \text{[Chemical Formula 1]}$$

in Chemical Formula 1,

M is a group 2 element, a group 13 element, a group 14 element, a 5th period transition metal, or 6th period transition metal, x is 0.1 to 0.7, and y is 0.01 to 0.2.

Preferably, the M in Chemical Formula 1 may be at least one element selected from the group consisting of Al, Mg, Ti, Zr, Nb, and W.

Preferably, the lithium transition metal oxide may include at least one compound selected from the group consisting of $Li_6Co_{0.77}Zn_{0.2}Al_{0.03}O_4$, $Li_6Co_{0.76}Zn_{0.2}Al_{0.04}O_4$, $Li_6Co_{0.75}Zn_{0.2}Al_{0.05}O_4$, $Li_6Co_{0.7}Zn_{0.25}Al_{0.05}O_4$, $Li_6Co_{0.65}Zn_{0.25}Al_{0.1}O_4$, $Li_6Co_{0.67}Zn_{0.3}Al_{0.03}O_4$, $Li_6Co_{0.66}Zn_{0.3}Al_{0.04}O_4$, $Li_6Co_{0.65}Zn_{0.3}Al_{0.05}O_4$, $Li_6Co_{0.6}Zn_{0.3}Al_{0.1}O_4$, $Li_6Co_{0.77}Zn_{0.2}Mg_{0.03}O_4$, $Li_6Co_{0.76}Zn_{0.2}Mg_{0.04}O_4$, $Li_6Co_{0.75}Zn_{0.2}Mg_{0.05}O_4$, $Li_6Co_{0.7}Zn_{0.25}Mg_{0.05}O_4$, $Li_6Co_{0.67}Zn_{0.3}Mg_{0.03}O_4$, $Li_6Co_{0.66}Zn_{0.3}Mg_{0.04}O_4$, $Li_6Co_{0.65}Zn_{0.3}Mg_{0.05}O_4$, $Li_6Co_{0.77}Zn_{0.2}Ti_{0.03}O_4$, $Li_6Co_{0.76}Zn_{0.2}Ti_{0.04}O_4$, $Li_6Co_{0.75}Zn_{0.2}Ti_{0.05}O_4$, $Li_6Co_{0.72}Zn_{0.25}Ti_{0.03}O_4$, $Li_6Co_{0.67}Zn_{0.3}Ti_{0.03}O_4$, $Li_6Co_{0.66}Zn_{0.3}Ti_{0.04}O_4$, $Li_6Co_{0.65}Zn_{0.3}Ti_{0.05}O_4$, $Li_6Co_{0.77}Zn_{0.2}Zr_{0.03}O_4$, $Li_6Co_{0.76}Zn_{0.2}Zr_{0.04}O_4$, $Li_6Co_{0.75}Zn_{0.2}Zr_{0.05}O_4$, $Li_6Co_{0.72}Zn_{0.25}Zr_{0.03}O_4$, $Li_6Co_{0.67}Zn_{0.3}Zr_{0.03}O_4$, $Li_6Co_{0.66}Zn_{0.3}Zr_{0.04}O_4$, $Li_6Co_{0.65}Zn_{0.3}Zr_{0.05}O_4$, $Li_6Co_{0.77}Zn_{0.2}Nb_{0.03}O_4$, $Li_6Co_{0.76}Zn_{0.2}Nb_{0.04}O_4$, $Li_6Co_{0.75}Zn_{0.2}Nb_{0.05}O_4$, $Li_6Co_{0.67}Zn_{0.3}Nb_{0.03}O_4$, $Li_6Co_{0.66}Zn_{0.3}Nb_{0.04}O_4$, $Li_6Co_{0.65}Zn_{0.3}Nb_{0.05}O_4$, $Li_6Co_{0.77}Zn_{0.2}W_{0.03}O_4$, $Li_6Co_{0.76}Zn_{0.2}W_{0.04}O_4$, $Li_6Co_{0.75}Zn_{0.2}W_{0.05}O_4$, $Li_6Co_{0.67}Zn_{0.3}W_{0.03}O_4$, $Li_6Co_{0.66}Zn_{0.3}W_{0.04}O_4$, and $Li_6Co_{0.65}Zn_{0.3}W_{0.05}O_4$.

The lithium transition metal oxide has a cumulative 50% particle diameter (D50) of 10.0 μm to 25.0 μm and a ratio ($D_{max}/D_{min}$) of a maximum particle diameter ($D_{max}$) to a minimum particle diameter ($D_{min}$) of 10.0 to 60.0 when measured by laser diffraction scattering particle size distribution.

The lithium transition metal oxide has a maximum particle diameter ($D_{max}$) of 30.0 μm to 90.0 μm and a minimum particle diameter ($D_{min}$) of 1.0 μm to 5.0 μm when measured by laser diffraction scattering particle size distribution.

And, the lithium transition metal oxide has a cumulative 5% particle diameter (D5) of 3.0 μm to 10.0 μm and a cumulative 95% particle diameter (D95) of 20.0 μm to 45.0 μm when measured by laser diffraction scattering particle size distribution.

IV. Positive Electrode for Lithium Secondary Battery

According to another embodiment of the present disclosure, there is provided a positive electrode for a lithium secondary battery.

The positive electrode for the lithium secondary battery may include a positive electrode active material, a binder, a conductive material, and the lithium transition metal oxide.

In addition, the positive electrode for the lithium secondary battery may include a positive electrode active material, a binder, a conductive material, and the positive electrode additive for the lithium secondary battery.

The lithium transition metal oxide and the positive electrode additive for the lithium secondary battery have a property of irreversibly releasing lithium during charging and discharging of the lithium secondary battery. Thus, the lithium transition metal oxide and the positive electrode additive for the lithium secondary battery may be included in the positive electrode for the lithium secondary battery, and may function as a sacrificial positive electrode material for prelithiation.

Preferably, the positive electrode for the lithium secondary battery includes a positive electrode material including a positive electrode active material, a conductive material, the sacrificial positive electrode material, and a binder; and a current collector for supporting the positive electrode material.

Herein, the sacrificial positive electrode material is the lithium transition metal oxide or the positive electrode additive for the lithium secondary battery. Regarding the matters of the sacrificial positive electrode material, refer to the description presented in above "I. Lithium transition metal oxide" and "III. Positive electrode additive for lithium secondary battery."

In the case of a high-capacity battery, the ratio of the negative electrode active material in the negative electrode needs to be more increased in order to increase the battery capacity, and thus the amount of lithium consumed in an SEI layer is also increased. Thus, after calculating the amount of lithium consumed in the SEI layer of the negative electrode, the amount of the sacrificial positive electrode material to be applied to the positive electrode may be inversely calculated to determine the design capacity of the battery.

According to one embodiment, the sacrificial positive electrode material may be included in an amount of more than 0 wt % and 15 wt % or less based on the total weight of the positive electrode material.

It is preferable that the content of the sacrificial positive electrode material is more than 0 wt % based on the total weight of the positive electrode material in order to compensate for irreversible lithium consumed in the formation of the SEI layer.

However, when an excessive amount of the sacrificial positive electrode material is included, the content of the positive electrode active material exhibiting a reversible charge/discharge capacity may be decreased to reduce the capacity of the battery, and residual lithium in the battery may be plated on the negative electrode, thereby causing a short circuit of the battery or hindering safety. Thus, it is preferable that the content of the sacrificial positive electrode material is 15 wt % or less based on the total weight of the positive electrode material.

Specifically, the content of the sacrificial positive electrode material is more than 0 wt %, 0.5 wt % or more, 1 wt % or more, 2 wt % or more, or 3 wt % or more; and 15 wt % or less, 12 wt % or less, or 10 wt % or less based on the total weight of the positive electrode material.

Preferably, the content of the sacrificial positive electrode material may be 0.5 wt % to 15 wt %, 1 wt % to 15 wt %, 1 wt % to 12 wt %, 2 wt % to 12 wt %, 2 wt % to 10 wt %, or 3 wt % to 10 wt % based on the total weight of the positive electrode material.

As the positive electrode active material, a compound known to be applicable to the lithium secondary battery in the art to which the present invention pertains may be used without particular limitation.

As a non-limiting example, the positive electrode active material may include NCM(Li[Ni,Co,Mn]O$_2$), NCMA(Li[Ni,Co,Mn,Al]O$_2$), LiCoO$_2$, LiNiO$_2$, LiMnO$_2$, LiMn$_2$O$_4$, LiNi$_{1-d}$Co$_d$O$_2$, LiCo$_{1-d}$Mn$_d$O$_2$, LiNi$_{1-d}$Mn$_d$O$_2$ (in above 0≤d<1), Li(Ni$_a$Co$_b$Mn$_c$)O$_4$ (0<a<2, 0<b<2, 0<c<2, a+b+c=2), LiMn$_{2-e}$Ni$_e$O$_4$, LiMn$_{2-e}$Co$_e$O$_4$ (in above 0<e<2), LiCoPO$_4$, LiFePO$_4$, and the like. As the positive electrode active material, one or a mixture of two or more of the above-described examples may be used.

According to one embodiment, the positive electrode active material may be included in an amount of 80 wt % to 95 wt % based on the total weight of the positive electrode material.

Specifically, the content of the positive electrode active material may be 80 wt % or more, 82 wt % or more, or 85 wt % or more; and 95 wt % or less, 93 wt % or less, or 90 wt % or less based on the total weight of the positive electrode material.

Preferably, the content of the positive electrode active material may be 82 wt % to 95 wt %, 82 wt % to 93 wt %, 85 wt % to 93 wt %, or 85 wt % to 90 wt % based on the total weight of the positive electrode material.

The conductive material is used to impart conductivity to the electrode.

A conductive material may be used without any particular limitation as long as it has electronic conductivity without causing a chemical change in the battery. As a non-limiting example, the conductive material may include a carbon-based material such as carbon black, acetylene black, ketjen black, channel black, furnace black, lamp black, summer black, carbon fiber, etc.; graphite such as natural graphite, artificial graphite, etc.; metal powders or metal fibers such as copper, nickel, aluminum, silver, etc.; conductive whiskeys such as zinc oxide, potassium titanate, etc.; conductive metal oxides such as titanium oxide, etc.; a conductive polymer such as a polyphenylene derivative, etc.; or the like. As the conductive material, one or a mixture of two or more of the above-described examples may be used.

The content of the conductive material may be adjusted in a range that does not cause a decrease in the capacity of the battery while expressing an appropriate level of conductivity. Preferably, the content of the conductive material may be 1 wt % to 10 wt %, or 1 wt % to 5 wt % based on the total weight of the positive electrode material.

The binder is used to attach the positive electrode material well to the current collector.

As a non-limiting example, the binder may be polyvinylidene fluoride (PVdF), vinylidene fluoride-hexafluoropropylene copolymer (PVdF-co-HFP), polyvinyl alcohol, polyacrylonitrile, carboxymethyl cellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluoro-rubber, etc. As the binder, one or a mixture of two or more of the above-described examples may be used.

The content of the binder may be adjusted in a range that does not cause a decrease in the capacity of the battery while expressing an appropriate level of adhesiveness. Preferably, the content of the binder may be 1 wt % to 10 wt %, or 1 wt % to 5 wt % based on the total weight of the positive electrode material.

As the current collector, a material known to be applicable to the positive electrode of a lithium secondary battery in the art to which the present invention pertains may be used without particular limitation.

As a non-limiting example, the current collector used herein may include stainless steel; aluminum; nickel; titanium; calcined carbon; aluminum or stainless steel surface treated with carbon, nickel, titanium, silver, etc.; or the like.

Preferably, the current collector may have a thickness of 3 μm to 500 μm. In order to increase adhesion of the positive electrode material, the current collector may have fine unevenness formed on a surface thereof. The current collector may have various forms such as film, sheet, foil, net, a porous body, a foam body, a nonwoven body, etc.

The positive electrode for the lithium secondary battery may be formed by stacking a positive electrode material including the positive electrode active material, the conductive material, the sacrificial positive electrode material, and a binder on the current collector.

V. Lithium Secondary Battery

According to another embodiment of the present disclosure, there is provided a lithium secondary battery including the positive electrode for the lithium secondary battery; a negative electrode; a separator; and an electrolyte.

The lithium secondary battery may include a positive electrode including the lithium transition metal oxide or a positive electrode additive for the lithium secondary battery. Accordingly, the lithium secondary battery may suppress gas generation at the positive electrode during charging and discharging, and may exhibit improved safety and lifespan. In addition, the lithium secondary battery may exhibit a high discharge capacity, excellent output property, and capacity retention.

Accordingly, the lithium secondary battery may be used as a source of energy supply with improved performance and safety in the field of portable electronic devices such as mobile phones, laptop computers, tablet computers, mobile batteries, and digital cameras; and transportation means such as electric vehicles, electric motorcycles, and personal mobility devices.

The lithium secondary battery may include an electrode assembly wound with a separator interposed between the positive electrode and the negative electrode, and a case in which the electrode assembly is embedded. In addition, the positive electrode, the negative electrode, and the separator may be impregnated with an electrolyte.

The lithium secondary battery may have various shapes such as a prismatic shape, a cylindrical shape, a pouch shape, etc.

Regarding the matters of the positive electrode, refer to the description presented in above "IV. Positive electrode for lithium secondary battery."

The negative electrode may include a negative electrode material including a negative electrode active material, a conductive material, and a binder; and a current collector for supporting the negative electrode material.

The negative electrode active material may include a material capable of reversibly intercalating and deintercalating lithium ions, lithium metal, an alloy of lithium metal, a material capable of doping to and dedoping from lithium, and a transition metal oxide.

An example of the material capable of reversibly intercalating and deintercalating lithium ions may include crystalline carbon, amorphous carbon, or a mixture thereof as a carbonaceous material. Specifically, the carbonaceous material may be natural graphite, artificial graphite, Kish graphite, pyrolytic carbon, mesophase pitches, mesophase pitch-based carbon fiber, meso-carbon microbeads, petroleum or coal tar pitch derived cokes, soft carbon, hard carbon, etc.

The alloy of lithium metal may be an alloy of lithium and a metal selected from the group consisting of Na, K, Rb, Cs, Fr, Be, Mg, Ca, Sr, Si, Sb, Pb, In, Zn, Ba, Ra, Ge, Al, Sn, Bi, Ga, and Cd.

The material which may be doped to and dedoped from lithium may be Si, Si—C composite, SiOx (0<x<2), Si-Q alloy (in which the Q is an element selected from the group consisting of an alkali metal, an alkaline earth metal, a group 13 element, a group 14 element, a group 15 element, a group 16 element, a transition metal, a rare earth element, and a combination thereof; but except for Si), Sn, $SnO_2$, a Sn—R alloy (in which the R is an element selected from the group consisting of an alkali metal, an alkaline earth metal, a group 13 element, a group 14 element, a group 15 element, a group 16 element, a transition metal, a rare earth element, and a combination thereof; but except for Sn), etc. In addition, the material, which may be doped to and dedoped from lithium, used herein may include a mixture of $SiO_2$ and at least one of the above examples. The Q and R may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, etc.

In addition, the transition metal oxide may be vanadium oxide, lithium vanadium oxide, lithium titanium oxide, etc.

Preferably, the negative electrode may include at least one negative electrode active material selected from the group consisting of a carbonaceous material and a silicon compound.

Herein, the carbonaceous material may be at least one material selected from the group consisting of natural graphite, artificial graphite, Kish graphite, pyrolytic carbon, mesophase pitches, mesophase pitch-based carbon fiber, meso-carbon microbeads, petroleum or coal tar pitch derived cokes, soft carbon, and hard carbon, which are exemplified above. And, the silicon compound may be a compound including Si as exemplified above, that is, Si, Si—C composite, SiOx (0<x<2), the Si-Q alloy, a mixture thereof, or a mixture of $SiO_2$ and at least one thereof.

According to one embodiment, the negative electrode active material may be included in an amount of 85 wt % to 98 wt % based on the total weight of the negative electrode material.

Specifically, the content of the negative electrode active material may be 85 wt % or more, 87 wt % or more, or 90 wt % or more; and 98 wt % or less, 97 wt % or less, or 95 wt % or less based on the total weight of the negative electrode material.

Preferably, the content of the negative electrode active material may be 85 wt % to 97 wt %, 87 wt % to 97 wt %, 87 wt % to 95 wt %, or 90 wt % to 95 wt % based on the total weight of the negative electrode material.

Regarding the matters of the conductive material and the binder included in the negative electrode material, and the current collector, refer to the description presented in above "IV. Positive electrode for lithium secondary battery."

The separator separates the positive electrode and the negative electrode, and provides a passage for lithium ions to move. As the separator, a separator known to be applicable to the lithium secondary battery in the art to which the present invention pertains may be used without any particular limitation. It is preferable that the separator has excellent wettability to the electrolyte while having low resistance to ionic migration of the electrolyte.

Specifically, the separator may be a porous polymer film made of a polyolefin-based polymer such as polyethylene, polypropylene, ethylene-butene copolymer, ethylene-hexene copolymer, ethylene-methacrylate copolymer, etc. The separator may be a multilayer film in which the porous polymer films are laminated in two or more layers. The separator may be a nonwoven fabric including glass fibers, polyethylene terephthalate fibers, etc. In addition, the separator may be coated with a ceramic component or a polymer material in order to secure heat resistance or mechanical strength.

As the electrolyte, an electrolyte known to be applicable to the lithium secondary battery in the art to which the present invention pertains may be used without any particular limitation. For example, the electrolyte may be an organic liquid electrolyte, an inorganic liquid electrolyte, a solid polymer electrolyte, a gel-type polymer electrolyte, a solid inorganic electrolyte, a molten inorganic electrolyte, etc.

Specifically, the electrolyte may include a non-aqueous organic solvent and a lithium salt.

The non-aqueous organic solvent may be used without any particular limitation as long as it may serve as a medium through which ions involved in an electrochemical reaction of the battery may move.

Specifically, the non-aqueous organic solvent may include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R-CN (R is a C2 to C20 linear, branched or cyclic hydrocarbon group, which may include a double bond aromatic ring or an ether bond); amides such as dimethylformamide; dioxolanes such as 1,3-dioxolane; sulfolane; and the like.

Among the above examples, a carbonate-based solvent may be preferably used as the non-aqueous organic solvent.

In particular, in consideration of the battery charge/discharge performance and compatibility with the sacrificial positive electrode material, the non-aqueous organic solvent used herein may preferably be a mixture of cyclic carbonates (for example, ethylene carbonate and propylene carbonate) having high ionic conductivity and high dielectric constant and linear carbonates (for example, ethyl methyl carbonate, dimethyl carbonate and diethyl carbonate) having low viscosity. When the cyclic carbonate and the linear carbonate are mixed at a volume ratio of 1:1 to 1:9 and used, it may be advantageous for expressing the performance described above.

In addition, the non-aqueous organic solvent used herein may preferably include a mixture of ethylene carbonate (EC) and ethyl methyl carbonate (EMC) at a volume ratio of 1:2 to 1:10; or a mixture of ethylene carbonate (EC), ethyl methyl carbonate (EMC) and dimethyl carbonate (DMC) at a volume ratio of 1-3:1-9:1.

The lithium salt included in the electrolyte may be dissolved in the non-aqueous organic solvent so as to act as a source of supplying lithium ions in the battery, thereby enabling the lithium secondary battery to basically operate and playing a role to promote the movement of lithium ions between the positive electrode and the negative electrode. Specifically, the lithium salt may include $LiPF_6$, $LiClO_4$, $LiA_sF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiN(SO_2F)_2$ (LiFSI, lithium bis(fluorosulfonyl) imide), LiCl, LiI, $LiB(C_2O_4)_2$, and the like. Preferably, the lithium salt may be $LiPF_6$, LiFSI, or a mixture thereof.

The lithium salt may be included in the electrolyte at a concentration of 0.1 M to 2.0 M. The lithium salt included within the concentration range may impart appropriate conductivity and viscosity to the electrolyte, thereby enabling excellent electrolyte performance.

Optionally, the electrolyte may include additives for the purpose of improving battery lifespan, suppressing reduction in battery capacity, and improving a battery discharge capacity.

For example, the additive may include haloalkylene carbonate-based compounds such as difluoroethylene carbonate, pyridine, triethyl phosphite, triethanolamine, cyclic ether, ethylene diamine, n-glyme, hexamethyl phosphoric triamide, nitrobenzene derivatives, sulfur, quinoneimine dye, N-substituted oxazolidinone, N,N-substituted imidazolidine, ethylene glycol dialkyl ether, ammonium salt, pyrrole, 2-methoxy ethanol, aluminum trichloride, etc. The additive may be included in an amount of 0.1 wt % to 5 wt % based on the total weight of the electrolyte.

ADVANTAGEOUS EFFECTS

The lithium transition metal oxide according to the present disclosure can maintain a stabilized lattice structure with a hetero-element introduced therein, and thus minimize a side reaction with an electrolyte so as to suppress gas generation during charging and discharging of a lithium secondary battery. The positive electrode additive for the lithium secondary battery including the lithium transition metal oxide may enable improved safety and lifespan of the lithium secondary battery.

BRIEF DESCRIPTION OF THE DRAWINGS

FIG. 1 is a graph showing a correlation between the irreversible capacity and the amount of gas generation of the lithium secondary batteries of Examples 1 to 5 and Comparative Examples 1 to 2.

FIG. 2 is a graph showing a correlation between the irreversible capacity and the amount of gas generation of the lithium secondary batteries of Examples 6 to 12.

FIG. 3 is a graph showing capacity cycle retention according to the accumulation of charge/discharge cycles of the lithium secondary batteries of Example 13 and Comparative Examples 3 to 6.

DETAILED DESCRIPTION OF THE EMBODIMENTS

Hereinafter, the function and effect of the present invention will be described in more detail through specific examples. However, these examples are provided for illustrative purposes only. The scope of the invention is not intended to be limited by these examples, and it is apparent to those skilled in the art that various changes and modifications can be made within the scope and spirit of the present invention.

Example 1

(1) Synthesis of Lithium Transition Metal Oxide

A raw material mixture was prepared by solid-state mixing of $Li_2O$, CoO, ZnO and MgO at a molar ratio of Li:Co:Zn:Mg=6:0.77:0.2:0.03.

The raw material mixture was heated at a heating rate of 1.6° C./min under an Ar atmosphere for 6 hours, and then calcined at 600° C. for 12 hours so as to obtain a lithium transition metal oxide of $Li_6Co_{0.77}Zn_{0.2}Mg_{0.03}O_4$.

The lithium transition metal oxide was pulverized by using a jaw crusher, and then classified by using a sieve shaker.

The lithium transition metal oxide and distilled water were mixed at a weight ratio of 1:2 and stirred to wash the lithium transition metal oxide. The washed lithium transition metal oxide was dried by heat treatment at 180° C. for 1 hour.

(2) Preparation of Lithium Secondary Battery

A positive electrode material slurry was prepared by mixing the lithium transition metal oxide ($Li_6Co_{0.77}Zn_{0.2}Mg_{0.03}O_4$) as a positive electrode additive, carbon black as a conductive material, and polyvinylidene fluoride (PVdF) as a binder at a weight ratio of 95:3:2 in an organic solvent (N-methylpyrrolidone). The positive electrode material slurry was applied to one surface of a current collector, which was an aluminum foil having a thickness of 15 μm, and was rolled and dried to prepare a positive electrode. For reference, in this experiment, a positive electrode active material was not added to the positive electrode material. The addition of the positive active material is shown in Example 13 below.

A negative electrode material slurry was prepared by mixing natural graphite as a negative electrode active material, carbon black as a conductive material, and carboxymethylcellulose (CMC) as a binder at a weight ratio of 95:3:2 in an organic solvent (N-methylpyrrolidone). The negative electrode material slurry was applied to one surface of a current collector, which was a copper foil having a thickness of 15 μm, and was rolled and dried to prepare a negative electrode.

A non-aqueous organic solvent was prepared by mixing ethylene carbonate (EC), ethyl methyl carbonate (EMC) and dimethyl carbonate (DMC) at a volume ratio of 3:4:3. An electrolyte was prepared by dissolving lithium salts of $LiPF_6$ at a concentration of 0.7 M and LiFSI at a concentration of 0.5 M in the non-aqueous organic solvent.

An electrode assembly was prepared by interposing porous polyethylene as a separator between the positive electrode and the negative electrode, and the electrode assembly was placed inside the case. A lithium secondary battery in the form of a pouch cell was manufactured by injecting the electrolyte into the case.

Example 2

Except for using $Al_2O_3$ instead of MgO, (1) a lithium transition metal oxide of $Li_6Co_{0.77}Zn_{0.2}Al_{0.03}O_4$ and (2) a lithium secondary battery including the same as a positive electrode additive were manufactured by the same method as in above Example 1.

Example 3

Except for using $TiO_2$ instead of MgO, (1) a lithium transition metal oxide of $Li_6Co_{0.77}Zn_{0.2}Ti_{0.03}O_4$ and (2) a lithium secondary battery including the same as a positive electrode additive were manufactured by the same method as in above Example 1.

Example 4

Except for using $ZrO_2$ instead of MgO, (1) a lithium transition metal oxide of $Li_6Co_{0.77}Zn_{0.2}Zr_{0.03}O_4$ and (2) a lithium secondary battery including the same as a positive electrode additive were manufactured by the same method as in above Example 1.

Example 5

Except for using $Nb_2O_5$ instead of MgO, (1) a lithium transition metal oxide of $Li_6Co_{0.77}Zn_{0.2}Nb_{0.03}O_4$ and (2) a lithium secondary battery including the same as a positive electrode additive were manufactured by the same method as in above Example 1.

Example 6

Except for using a raw material mixture obtained by solid-state mixing of $Li_2O$, CoO, ZnO and $Al_2O_3$ at a molar ratio of Li:Co:Zn:Al=6:0.7:0.25:0.05, (1) a lithium transition metal oxide of $Li_6Co_{0.7}Zn_{0.25}Al_{0.05}O_4$ and (2) a lithium secondary battery including the same as a positive electrode additive were manufactured by the same method as in above Example 1.

Example 7

Except for using MgO instead of $Al_2O_3$, (1) a lithium transition metal oxide of $Li_6Co_{0.7}Zn_{0.25}Mg_{0.05}O_4$ and (2) a lithium secondary battery including the same as a positive electrode additive were manufactured by the same method as in above Example 6.

Example 8

Except for using a raw material mixture obtained by solid-state mixing of $Li_2O$, CoO, ZnO and $TiO_2$ at a molar ratio of Li:Co:Zn:Ti=6:0.72:0.25:0.03, (1) a lithium transition metal oxide of $Li_6Co_{0.72}Zn_{0.25}Ti_{0.03}O_4$ and (2) a lithium secondary battery including the same as a positive electrode additive were manufactured by the same method as in above Example 1.

Example 9

Except for using $ZrO_2$ instead of $TiO_2$, (1) a lithium transition metal oxide of $Li_6Co_{0.72}Zn_{0.25}Zr_{0.03}O_4$ and (2) a lithium secondary battery including the same as a positive electrode additive were manufactured by the same method as in above Example 8.

Example 10

Except for using a raw material mixture obtained by solid-state mixing of $Li_2O$, CoO, ZnO and $Al_2O_3$ at a molar ratio of Li:Co:Zn:Al=6:0.65:0.3:0.05, (1) a lithium transition metal oxide of $Li_6Co_{0.65}Zn_{0.3}Al_{0.05}O_4$ and (2) a lithium secondary battery including the same as a positive electrode additive were manufactured by the same method as in above Example 1.

Example 11

Except for using a raw material mixture obtained by solid-state mixing of $Li_2O$, CoO, ZnO and $Al_2O_3$ at a molar ratio of Li:Co:Zn:Al=6:0.65:0.25:0.1, (1) a lithium transition metal oxide of $Li_6Co_{0.65}Zn_{0.25}Al_{0.1}O_4$ and (2) a lithium secondary battery including the same as a positive electrode additive were manufactured by the same method as in above Example 1.

Example 12

Except for using a raw material mixture obtained by solid-state mixing of $Li_2O$, CoO, ZnO and $Al_2O_3$ at a molar ratio of Li:Co:Zn:Al=6:0.6:0.3:0.1, (1) a lithium transition metal oxide of $Li_6Co_{0.6}Zn_{0.3}Al_{0.1}O_4$ and (2) a lithium secondary battery including the same as a positive electrode additive were manufactured by the same method as in above Example 1.

Example 13

Except for further adding the positive electrode active material in the preparation of the positive electrode and changing the composition of the negative electrode active material in the preparation of the negative electrode, a lithium secondary battery was manufactured by the same method as in above Example 6.

Specifically, a positive electrode material slurry was prepared by mixing a NCMA(Li[Ni,Co,Mn,Al]O$_2$)-based compound (NTA-X12M, L&F) as a positive electrode active material, the lithium transition metal oxide (Li$_6$Co$_{0.7}$Zn$_{0.25}$Al$_{0.05}$O$_4$) as a positive electrode additive, carbon black as a conductive material, and polyvinylidene fluoride (PVdF) as a binder at a weight ratio of 93.8:1.2:3:2 in an organic solvent (N-methylpyrrolidone). The positive electrode material slurry was applied to one surface of a current collector, which was an aluminum foil having a thickness of 15 μm, and was rolled and dried to prepare a positive electrode.

A negative electrode material slurry was prepared by mixing a mixture of natural graphite and SiO (weight ratio=9:1) as a negative electrode active material, carbon black as a conductive material, and carboxymethylcellulose (CMC) as a binder at a weight ratio of 95:3:2 in an organic solvent (N-methylpyrrolidone). The negative electrode material slurry was applied to one surface of a current collector, which was a copper foil having a thickness of 15 μm, and was rolled and dried to prepare a negative electrode.

An electrode assembly was prepared by interposing porous polyethylene as a separator between the positive electrode and the negative electrode, and the electrode assembly was placed inside the case. A lithium secondary battery in the form of a pouch cell was manufactured by injecting the electrolyte into the case.

Comparative Example 1

Except for mixing Li$_2$O and CoO at a molar ratio of Li:Co=6:1 without the addition of ZnO and MgO, (1) a lithium transition metal oxide of Li$_6$CoO$_4$ and (2) a lithium secondary battery including the same as a positive electrode additive were manufactured by the same method as in above Example 1.

Comparative Example 2

Except for mixing Li$_2$O, CoO and ZnO at a molar ratio of Li:Co:Zn=6:0.7:0.3 without the addition of MgO, (1) a lithium transition metal oxide of Li$_6$Co$_{0.7}$Zn$_{0.3}$O$_4$ and (2) a lithium secondary battery including the same as a positive electrode additive were manufactured by the same method as in above Example 1.

Comparative Example 3

Except for using Li$_6$CoO$_4$ obtained in above Comparative Example 1 instead of Li$_6$Co$_{0.7}$Zn$_{0.25}$Al$_{0.05}$O$_4$ as a positive electrode additive in the preparation of the positive electrode, a lithium secondary battery was manufactured by the same method as in above Example 13.

Comparative Example 4

Except for using Li$_6$Co$_{0.7}$Zn$_{0.3}$O$_4$ obtained in above Comparative Example 2 instead of Li$_6$Co$_{0.7}$Zn$_{0.25}$Al$_{0.05}$O$_4$ as a positive electrode additive in the preparation of the positive electrode, a lithium secondary battery was manufactured by the same method as in above Example 13.

Comparative Example 5

Except for mixing a NCMA(Li[Ni,Co,Mn,Al]O$_2$)-based compound (NTA-X12M, L&F) as a positive electrode active material, DN2O (Li$_2$NiO$_2$, POSCO Chemical) instead of the lithium transition metal oxide (Li$_6$Co$_{0.7}$Zn$_{0.25}$Al$_{0.05}$O$_4$) as a positive electrode additive, carbon black as a conductive material, and polyvinylidene fluoride (PVdF) as a binder at a weight ratio of 91.2:3.8:3:2 in the preparation of the positive electrode, a lithium secondary battery was manufactured by the same method as in above Example 13.

Comparative Example 6

Except for not adding the positive electrode additive in the preparation of the positive electrode, a lithium secondary battery was manufactured by the same method as in above Example 13.

Test Example 1

The particle size distribution of the lithium transition metal oxides obtained in Examples 1 to 12 and Comparative Examples 1 and 2 was measured using a laser diffraction scattering particle size distribution analyzer (product name: Partica LA-960V2, manufacturer: HORIBA). At this time, the measurement was performed using N-methyl pyrrolidon (NMP) as a dispersion medium of the lithium transition metal oxide.

TABLE 1

| | D5 (μm) | D50 (μm) | D95 (μm) | $D_{max}$ (μm) | $D_{min}$ (μm) | $D_{max}/D_{min}$ |
|---|---|---|---|---|---|---|
| Example 1 (Li$_6$Co$_{0.77}$Zn$_{0.2}$Mg$_{0.03}$O$_4$) | 5.9 | 14.9 | 32.7 | 51.3 | 1.4 | 36.64 |
| Example 2 (Li$_6$Co$_{0.77}$Zn$_{0.2}$Al$_{0.03}$O$_4$) | 7.5 | 15.3 | 27.8 | 47.4 | 2.6 | 18.23 |
| Example 3 (Li$_6$Co$_{0.77}$Zn$_{0.2}$Ti$_{0.03}$O$_4$) | 8.1 | 18.1 | 40.0 | 73.2 | 2.1 | 34.86 |
| Example 4 (Li$_6$Co$_{0.77}$Zn$_{0.2}$Zr$_{0.03}$O$_4$) | 6.5 | 15.4 | 32.5 | 47.3 | 1.2 | 39.42 |
| Example 5 (Li$_6$Co$_{0.77}$Zn$_{0.2}$Nb$_{0.03}$O$_4$) | 7.1 | 17.4 | 41.5 | 62.8 | 1.5 | 41.87 |
| Example 6 (Li$_6$Co$_{0.7}$Zn$_{0.25}$Al$_{0.05}$O$_4$) | 8.3 | 16.8 | 30.0 | 51.2 | 3.4 | 15.05 |
| Example 7 (Li$_6$Co$_{0.7}$Zn$_{0.25}$Mg$_{0.05}$O$_4$) | 6.7 | 16.1 | 31.3 | 56.0 | 1.8 | 31.11 |
| Example 8 (Li$_6$Co$_{0.72}$Zn$_{0.25}$Ti$_{0.03}$O$_4$) | 9.8 | 21.9 | 42.9 | 87.7 | 3.0 | 29.23 |
| Example 9 (Li$_6$Co$_{0.72}$Zn$_{0.25}$Zr$_{0.03}$O$_4$) | 6.0 | 15.5 | 28.6 | 51.1 | 0.9 | 56.78 |
| Example 10 (Li$_6$Co$_{0.65}$Zn$_{0.3}$Al$_{0.05}$O$_4$) | 7.3 | 16.7 | 33.9 | 66.7 | 2.6 | 25.65 |
| Example 11 (Li$_6$Co$_{0.65}$Zn$_{0.25}$Al$_{0.1}$O$_4$) | 5.3 | 11.6 | 21.3 | 38.3 | 2.3 | 16.65 |
| Example 12 (Li$_6$Co$_{0.6}$Zn$_{0.3}$Al$_{0.1}$O$_4$) | 6.1 | 14.7 | 31.2 | 52.5 | 2.9 | 18.10 |
| Comparative Example 1 (Li$_6$CoO$_4$) | 5.6 | 11.9 | 22.8 | 44.6 | 2.6 | 17.15 |
| Comparative Example 2 (Li$_6$Co$_{0.7}$Zn$_{0.3}$O$_4$) | 6.1 | 14.2 | 28.7 | 58.3 | 2.0 | 29.15 |

Referring to Table 1, it was confirmed that the lithium transition metal oxides of Examples simultaneously satisfy a D50 value of 10.0 μm to 25.0 μm and a $D_{max}/D_{min}$ value of 10.0 to 60.0.

Referring to Comparative Examples 1 and 2, as Zn is introduced into Li$_6$CoO$_4$, the D50 value of the particles tends to increase.

In addition, the particle size distribution varies depending on the additionally introduced element. In particular, when Al is additionally introduced into the lithium transition metal oxide into which Zn is introduced, the $D_{min}$ value tends to increase and the $D_{max}$ value tends to decrease. For example, it was confirmed that Examples 2, 6, 10, 11, and 12 into which Al is introduced have the $D_{max}/D_{min}$ value of less than 30, which is smaller than the $D_{max}/D_{min}$ value of Examples 1, 3, 4, 5, 7, and 9 into which Mg, Ti, Zr, or Nb is introduced. Example 8 into which Ti is introduced has the $D_{max}/D_{min}$ value of less than 30, but has a relatively large $D_{max}$ value (87.7 µm) compared to other oxides.

Test Example 2

With respect to the lithium secondary batteries obtained in above Examples 1 to 12 and above Comparative Examples 1 and 2, the amount of cumulative gas generation according to the accumulation of charge/discharge cycles was measured by the following method, and the measured amount of gas generation according to the cumulative charge capacity is shown in Table 2, FIG. 1 and FIG. 2. The amount of cumulative gas generation according to high-temperature storage is shown in Table 3.

(1) Measurement of Formation (Initial Charge) Capacity and Charge/Discharge Capacity A pouch cell-type lithium secondary battery was subjected to a cycle of constant current-constant voltage charge up to 4.25 V and constant current discharge to 2.5 V at 0.1 C at 45° C. with resting for 20 minutes between charge and discharge, and then the formation capacity and the charge/discharge capacity were measured.

(2) Measurement of the Amount of Cumulative Gas Generation According to the Accumulation of Charge/Discharge After the lithium secondary battery was operated under the charge/discharge conditions of above (1), the pouch cell at the time of measuring the amount of gas generation was temporarily recovered in the discharged state. Using a hydrometer (MATSUHAKU, TWD-150DM), a difference between the original weight of the pouch cell and the weight thereof in water was measured to calculate a change in volume in the pouch cell, and the change in volume was divided by a weight of the electrode active material so as to calculate the amount of gas generation per weight.

(3) Measurement of the Amount of Cumulative Gas Generation According to High-Temperature Storage A pouch cell-type lithium secondary battery was subjected to a constant current-constant voltage charge up to 4.25 V at 0.1 C at a temperature of 45° C., collected to measure the formation capacity, and then stored in a 60° C. chamber. The lithium secondary battery was taken out at an interval of one week to measure a difference between the original weight of the pouch cell and the weight thereof in water by using a hydrometer (MATSUHAKU, TWD-150DM) and to calculate a change in volume in the pouch cell, after which the change in volume was divided by a weight of the electrode active material to calculate the amount of gas generation per weight.

The following table 2 shows the amount of cumulative gas generation after the $1^{st}$ $2^{nd}$, $10^{th}$, $30^{th}$ and $50^{th}$ cumulative cycles after formation ($0^{th}$ charge/discharge).

TABLE 2

| | Formation | | Amount of cumulative gas generation (mL/g) | | | | |
|---|---|---|---|---|---|---|---|
| | Capacity (mAh/g) | Amount of gas generation (mL/g) | 1st | 2nd | 10th | 30th | 50th |
| Example 1 ($Li_6Co_{0.77}Zn_{0.2}Mg_{0.03}O_4$) | 805.5 | 95.8 | −0.22 | −0.28 | 0.07 | 0.39 | 0.56 |
| Example 2 ($Li_6Co_{0.77}Zn_{0.2}Al_{0.03}O_4$) | 746.6 | 85.1 | −0.04 | −0.14 | −0.06 | 0.11 | 0.16 |
| Example 3 ($Li_6Co_{0.77}Zn_{0.2}Ti_{0.03}O_4$) | 770.3 | 102.5 | −0.08 | −0.13 | 0.16 | 0.47 | 0.85 |
| Example 4 ($Li_6Co_{0.77}Zn_{0.2}Zr_{0.03}O_4$) | 763.1 | 91.8 | −0.23 | −0.22 | 0.17 | 0.64 | 0.83 |
| Example 5 ($Li_6Co_{0.77}Zn_{0.2}Nb_{0.03}O_4$) | 771.3 | 92.1 | −0.33 | −0.16 | 0.11 | 0.58 | 0.89 |
| Example 6 ($Li_6Co_{0.7}Zn_{0.25}Al_{0.05}O_4$) | 822.6 | 113.1 | −0.10 | −0.14 | −0.07 | 0.05 | 0.25 |
| Example 7 ($Li_6Co_{0.7}Zn_{0.25}Mg_{0.05}O_4$) | 808.6 | 105.6 | −0.11 | 0.03 | 0.05 | 0.36 | 0.53 |
| Example 8 ($Li_6Co_{0.72}Zn_{0.25}Ti_{0.03}O_4$) | 801.0 | 107.0 | −0.08 | −0.07 | 0.35 | 0.92 | 0.97 |
| Example 9 ($Li_6Co_{0.72}Zn_{0.25}Zr_{0.03}O_4$) | 787.6 | 105.4 | −0.03 | −0.04 | 0.45 | 1.16 | 1.46 |
| Example 10 ($Li_6Co_{0.65}Zn_{0.3}Al_{0.05}O_4$) | 813.7 | 98.4 | −0.35 | −0.49 | −0.16 | −0.41 | −0.28 |
| Example 11 ($Li_6Co_{0.65}Zn_{0.25}Al_{0.1}O_4$) | 818.3 | 96.5 | −0.03 | −0.23 | 0.02 | −0.09 | −0.06 |
| Example 12 ($Li_6Co_{0.6}Zn_{0.3}Al_{0.1}O_4$) | 807.2 | 96.2 | −0.25 | −0.19 | −0.01 | 0.02 | 0.04 |
| Comparative Example 1 ($Li_6CoO_4$) | 903.0 | 129.1 | 5.92 | 6.91 | 8.04 | 9.17 | 10.10 |
| Comparative Example 2 ($Li_6Co_{0.7}Zn_{0.3}O_4$) | 827.9 | 105.0 | −0.16 | −0.19 | 0.44 | 1.68 | 2.11 |

As shown in Table 2 and FIG. 1, Examples 1 to 5 had a smaller initial charge capacity than Comparative Examples 1 and 2. However, the amount of cumulative gas generation after $50^{th}$ cycle was 1 mL/g or less in Examples 1 to 5, indicating a remarkably excellent effect of reducing gas. In particular, Example 1 had the largest initial charge capacity among the Examples, and also had the relatively small amount of cumulative gas generation. In Example 2, although the initial charge capacity was somewhat low, the amount of cumulative gas generation was the lowest, thereby indicating an excellent effect of reducing gas.

As shown in Table 2 and FIG. 2, in the case of Ti and Zr, the additional effect of reducing gas by the addition of hetero-elements was relatively insignificant. Referring to Examples 6, 10, 11, and 12, it was confirmed that the higher the molar content of Al, the greater the effect of reducing gas.

The following table 3 shows the amount of cumulative gas generation after one, two, three and four weeks after formation ($0^{th}$ charge) and storage at 60° C.

TABLE 3

| | Amount of cumulative gas generation (mL/g) | | | |
|---|---|---|---|---|
| | Week 1 | Week 2 | Week 3 | Week 4 |
| Example 1 ($Li_6Co_{0.77}Zn_{0.2}Mg_{0.03}O_4$) | −0.46 | −0.38 | 0.35 | 0.42 |
| Example 2 ($Li_6Co_{0.77}Zn_{0.2}Al_{0.03}O_4$) | −0.04 | −0.04 | 0.69 | 0.56 |
| Example 3 ($Li_6Co_{0.77}Zn_{0.2}Ti_{0.03}O_4$) | −0.13 | −0.01 | 0.44 | 0.42 |
| Example 4 ($Li_6Co_{0.77}Zn_{0.2}Zr_{0.03}O_4$) | −0.27 | 0.31 | 0.67 | 0.72 |
| Example 5 ($Li_6Co_{0.77}Zn_{0.2}Nb_{0.03}O_4$) | −0.29 | 0.02 | 0.20 | 0.35 |
| Example 6 ($Li_6Co_{0.7}Zn_{0.25}Al_{0.05}O_4$) | −0.52 | −0.28 | −0.22 | −0.23 |
| Example 7 ($Li_6Co_{0.7}Zn_{0.25}Mg_{0.05}O_4$) | −0.35 | −0.23 | 0.25 | 0.26 |
| Example 8 ($Li_6Co_{0.72}Zn_{0.25}Ti_{0.03}O_4$) | −0.10 | 0.26 | 0.91 | 1.14 |
| Example 9 ($Li_6Co_{0.72}Zn_{0.25}Zr_{0.03}O_4$) | −0.11 | 0.27 | 1.00 | 1.23 |
| Example 10 ($Li_6Co_{0.65}Zn_{0.3}Al_{0.05}O_4$) | −0.80 | 0.10 | 0.11 | 0.21 |
| Example 11 ($Li_6Co_{0.65}Zn_{0.25}Al_{0.1}O_4$) | −0.60 | −0.45 | −0.69 | −0.08 |
| Example 12 ($Li_6Co_{0.6}Zn_{0.3}Al_{0.1}O_4$) | −0.58 | −0.23 | −0.17 | −0.21 |
| Comparative Example 1 ($Li_6CoO_4$) | 9.95 | 10.19 | 9.70 | 9.56 |
| Comparative Example 2 ($Li_6Co_{0.7}Zn_{0.3}O_4$) | −0.15 | −0.12 | 0.50 | 1.04 |

As shown in Table 3, Examples 1 to 5 were confirmed to have a significantly superior effect of reducing gas compared to Comparative Examples 1 and 2 with the amount of cumulative gas generation of 1 mL/g or less in high-temperature storage at 60° C.

Referring to Examples 6 to 12, it was confirmed that the lithium transition metal oxide into which Al was introduced had an excellent effect of reducing gas in high-temperature storage.

Test Example 3

With respect to the lithium secondary batteries of Example 13 and Comparative Examples 3 to 6 in which the positive electrode active material and the positive electrode additive are mixed and applied, the capacity cycle retention and the amount of cumulative gas generation according to the accumulation of charge/discharge cycles were measured by the following method, and the measured capacity retention and the amount of cumulative gas generation are shown in the graph of FIG. 3 and table 4.

(1) Measurement of Formation (Initial Charge) Capacity and Charge/Discharge Capacity A pouch cell-type lithium secondary battery was subjected to a cycle of constant current-constant voltage charge up to 4.25 V and constant current discharge to 2.5 V at 0.1 C at a temperature of 45° C. with resting for 20 minutes between charge and discharge, and then the formation capacity and charge/discharge capacity up to $100^{th}$ cycle were measured.

(2) Measurement of the Amount of Cumulative Gas Generation According to the Accumulation of Charge/Discharge After the lithium secondary battery was operated under the charge/discharge conditions of above (1), the pouch cell at the time of measuring the amount of gas generation was temporarily recovered in the discharged state. Using a hydrometer (MATSUHAKU, TWD-150DM), a difference between the original weight of the pouch cell and the weight thereof in water was measured to calculate a change in volume in the pouch cell, and the change in volume was divided by a weight of the electrode active material so as to calculate the amount of gas generation per weight.

(3) Measurement of the Amount of Cumulative Gas Generation According to High-Temperature Storage A pouch cell-type lithium secondary battery was subjected to a constant current-constant voltage charge up to 4.25 V at 0.1 C at a temperature of 45° C., collected to measure the formation capacity, and then stored in a 60° C. chamber. The lithium secondary battery was taken out at an interval of one week to measure a difference between the original weight of the pouch cell and the weight thereof in water by using a hydrometer (MATSUHAKU, TWD-150DM) and to calculate a change in volume in the pouch cell, after which the change in volume was divided by a weight of the electrode active material to calculate the amount of gas generation per weight.

The following table 4 shows the formation ($0^{th}$ charge/discharge) capacity, the amount of cumulative gas generation after the $50^{th}$ and $100^{th}$ cumulative cycles, and the discharge capacity retention after the $100^{th}$ cycle.

TABLE 4

| | Formation capacity (mAh/g) | | Amount of gas generation (mL/g) | | Capacity retention @ 100th cycle |
|---|---|---|---|---|---|
| | Charge capacity | Discharge capacity | 50th | 100th | |
| Example 13 (NCMA + $Li_6Co_{0.7}Zn_{0.25}Al_{0.05}O_4$) | 243.5 | 214.8 | 0.05 | 0.07 | 91.7 |
| Comparative Example 3 (NCMA + $Li_6CoO_4$) | 243.3 | 215.4 | 0.03 | 0.24 | 88.5 |

TABLE 4-continued

|  | Formation capacity (mAh/g) | | Amount of gas generation (mL/g) | | Capacity retention @ 100th cycle |
|---|---|---|---|---|---|
|  | Charge capacity | Discharge capacity | 50th | 100th |  |
| Comparative Example 4 (NCMA + $Li_6Co_{0.7}Zn_{0.3}O_4$) | 243.4 | 214.9 | 0.14 | 0.16 | 88.2 |
| Comparative Example 5 (NCMA + DN20) | 242.2 | 214.5 | 0.02 | 0.11 | 86.3 |
| Comparative Example 6 (NCMA) | 236.0 | 201.3 | 0.10 | 0.20 | 86.2 |

As shown in above table 4 and FIG. 3, the discharge capacities of Example 13 and Comparative Examples 3 to 5 were larger than Comparative Example 6 in which the positive electrode additive (sacrificial positive electrode material) was not applied. It can be seen that the sacrificial positive electrode material compensates for the irreversible lithium consumed in the formation of the SEI layer at the negative electrode.

In contrast, in the case of Comparative Example 6, there was no sacrificial positive electrode material to compensate for irreversible lithium, and thus lithium of the positive electrode material was consumed, resulting in a decrease in the discharge capacity and indicating a discharge capacity of 201.3 mAh/g.

In the case of Example 13, the amount of cumulative gas generation at the $100^{th}$ cycle was 0.07 mL/g, which was less than 0.24 mL/g of Comparative Example 3 and less than 0.16 mL/g of Comparative Example 4 in which the sacrificial positive electrode material was not applied. In Example 13, since Al was additionally introduced into $Li_6Co_{0.7}Zn_{0.3}O_4$ of Comparative Example 4 into which Zn was introduced, $CoO_2$ formed after initial charge was more effectively stabilized than the case where only Zn was introduced. Accordingly, the side reaction with the electrolyte was effectively prevented, thereby suppressing additional gas generation.

In the case of Comparative Example 5, the amount of cumulative gas generation at the $50^{th}$ cycle was the smallest as 0.02 mL/g, but the amount of increased gas generation from the $50^{th}$ cycle to the $100^{th}$ cycle was 0.09 mL/g, thus having a chance that the gas generation will continue to increase thereafter. This is also the same as in Comparative Example 3. In contrast, in the case of Example 13, the amount of increased gas generation from the $50^{th}$ cycle to the $100^{th}$ cycle was 0.02 mL/g, and thus it can be seen that the gas generation is suppressed as the charge/discharge cycle continues.

In the case of Example 13, Comparative Example 3 and Comparative Example 4 to which the Co-based sacrificial positive electrode material was applied, the capacity retention at $100^{th}$ cycle was 88.2% or more. Comparative Example 5 to which the Ni-based sacrificial positive electrode material was applied and Comparative Example 6 to which the sacrificial positive electrode material was not applied showed the capacity retention of 86.3% and 86.2%, respectively, which were significantly lower than that of Example 13. In particular, in the case of Example 13 to which Al was additionally introduced, it was confirmed that the capacity retention was significantly improved to 91.7%. This may be because the addition of Al stabilizes the crystal phase after initial charge to prevent side reactions with the electrolyte, as seen in the amount of cumulative gas generation described above.

Accordingly, when a Co-based sacrificial positive electrode material, in particular, a sacrificial positive electrode material having the composition of Chemical Formula 1 is applied to a lithium secondary battery including an actual positive electrode material, it can be confirmed that the material preserves the initial discharge capacity and suppresses the amount of gas generation in the battery, and the capacity retention is also excellent after the $100^{th}$ cycle.

The following table 5 shows the amount of cumulative gas generation after one, two, three and four weeks after formation ($0^{th}$ charge) and storage at 72° C.

TABLE 5

|  | Amount of cumulative gas generation (mL/g) | | | |
|---|---|---|---|---|
|  | Week 1 | Week 2 | Week 3 | Week 4 |
| Example 13 (NCMA + $Li_6Co_{0.7}Zn_{0.25}Al_{0.05}O_4$) | 0.09 | 0.12 | 0.12 | 0.15 |
| Comparative Example 3 (NCMA + $Li_6CoO_4$) | 1.07 | 1.38 | 1.78 | 2.01 |
| Comparative Example 4 (NCMA + $Li_6Co_{0.7}Zn_{0.3}O_4$) | 0.11 | 0.14 | 0.18 | 0.22 |
| Comparative Example 5 (NCMA + DN20) | 0.54 | 0.65 | 0.80 | 0.82 |
| Comparative Example 6 (NCMA) | 0.21 | 0.29 | 0.53 | 0.55 |

As shown in above table 5, Example 13 showed the lowest amount of cumulative gas generation of 0.15 mL/g after four weeks. This may be because, like the result of the charge/discharge cycle, the hetero-element introduced into $Li_6CoO_4$ effectively stabilizes $CoO_2$ formed after the initial charge so as to prevent a side reaction with an electrolyte, thereby suppressing additional gas generation.

In addition, Example 13 generated gas less than Comparative Example 6 in which the sacrificial positive electrode material was not applied, and this result may be an experimental error, or the positive electrode additive included in the lithium secondary battery is likely to not only suppress gas generation but also absorb the generated gas.

In the above, although the present invention has been described with reference to limited embodiments and drawings, the present invention is not limited thereto, and various modifications and variations are possible within the technical idea of the present invention and within the equivalent scope of the claims to be described below by those skilled in the art to which the present invention pertains.

The invention claimed is:

1. A lithium transition metal oxide, which is a lithium cobalt oxide containing a hetero-element,
wherein the hetero-element comprises a 4th period transition metal; and at least one selected from the group consisting of a group 2 element, a group 13 element, a group 14 element, a 5th period transition metal, and a 6th period transition metal, and
the lithium transition metal oxide has a cumulative 50% particle diameter (D50) of 10.0 μm to 25.0 μm and a ratio ($D_{max}/D_{min}$) of a maximum particle diameter ($D_{max}$) to a minimum particle diameter ($D_{min}$) of 10.0 to 60.0 when measured by laser diffraction scattering particle size distribution, wherein the lithium transition metal oxide is represented by the following Chemical Formula 1:

$Li_6Co_{1-x-y}Zn_xM_yO_4$     [Chemical Formula 1]

wherein,
M is at least one selected from the group consisting of Al, Mg, Ti, Zr, Nb, and W,
x is 0.1 to 0.7, and
y is 0.01 to 0.2.

2. The lithium transition metal oxide of claim 1,
wherein the lithium transition metal oxide has a cumulative 5% particle diameter (D5) of 3.0 μm to 10.0 μm and a cumulative 95% particle diameter (D95) of 20.0 μm to 45.0 μm when measured by laser diffraction scattering particle size distribution.

3. The lithium transition metal oxide of claim 1,
wherein the lithium transition metal oxide is at least one compound selected from the group consisting of
$Li_6Co_{0.77}Zn_{0.2}Al_{0.03}O_4$, $Li_6Co_{0.76}Zn_{0.2}Al_{0.04}O_4$,
$Li_6Co_{0.75}Zn_{0.2}Al_{0.05}O_4$, $Li_6Co_{0.7}Zn_{0.25}Al_{0.05}O_4$,
$Li_6Co_{0.65}Zn_{0.25}Al_{0.1}O_4$, $Li_6Co_{0.67}Zn_{0.3}Al_{0.03}O_4$,
$Li_6Co_{0.66}Zn_{0.3}Al_{0.04}O_4$, $Li_6Co_{0.65}Zn_{0.3}Al_{0.05}O_4$,
$Li_6Co_{0.6}Zn_{0.3}Al_{0.1}O_4$, $Li_6Co_{0.77}Zn_{0.2}Mg_{0.03}O_4$,
$Li_6Co_{0.76}Zn_{0.2}Mg_{0.04}O_4$, $Li_6Co_{0.75}Zn_{0.2}Mg_{0.05}O_4$,
$Li_6Co_{0.7}Zn_{0.25}Mg_{0.05}O_4$, $Li_6Co_{0.67}Zn_{0.3}Mg_{0.03}O_4$,
$Li_6Co_{0.66}Zn_{0.3}Mg_{0.04}O_4$, $Li_6Co_{0.65}Zn_{0.3}Mg_{0.05}O_4$,
$Li_6Co_{0.77}Zn_{0.2}Ti_{0.03}O_4$, $Li_6Co_{0.76}Zn_{0.2}Ti_{0.04}O_4$,
$Li_6Co_{0.75}Zn_{0.2}Ti_{0.05}O_4$, $Li_6Co_{0.72}Zn_{0.25}Ti_{0.03}O_4$,
$Li_6Co_{0.67}Zn_{0.3}Ti_{0.03}O_4$, $Li_6Co_{0.66}Zn_{0.3}Ti_{0.04}O_4$,
$Li_6Co_{0.65}Zn_{0.3}Ti_{0.05}O_4$, $Li_6Co_{0.77}Zn_{0.2}Zr_{0.03}O_4$,
$Li_6Co_{0.76}Zn_{0.2}Zr_{0.04}O_4$, $Li_6Co_{0.75}Zn_{0.2}Zr_{0.05}O_4$,
$Li_6Co_{0.72}Zn_{0.25}Zr_{0.03}O_4$, $Li_6Co_{0.67}Zn_{0.3}Zr_{0.03}O_4$,
$Li_6Co_{0.66}Zn_{0.3}Zr_{0.04}O_4$, $Li_6Co_{0.65}Zn_{0.3}Zr_{0.05}O_4$,
$Li_6Co_{0.77}Zn_{0.2}Nb_{0.03}O_4$, $Li_6Co_{0.76}Zn_{0.2}Nb_{0.04}O_4$,
$Li_6Co_{0.75}Zn_{0.2}Nb_{0.05}O_4$, $Li_6Co_{0.67}Zn_{0.3}Nb_{0.03}O_4$,
$Li_6Co_{0.66}Zn_{0.3}Nb_{0.04}O_4$, $Li_6Co_{0.65}Zn_{0.3}Nb_{0.05}O_4$,
$Li_6Co_{0.77}Zn_{0.2}W_{0.03}O_4$, $Li_6Co_{0.76}Zn_{0.2}W_{0.04}O_4$,
$Li_6Co_{0.75}Zn_{0.2}W_{0.05}O_4$, $Li_6Co_{0.67}Zn_{0.3}W_{0.03}O_4$,
$Li_6Co_{0.66}Zn_{0.3}W_{0.04}O_4$, and $Li_6Co_{0.65}Zn_{0.3}W_{0.05}O_4$.

4. A method for preparing the lithium transition metal oxide of claim 1, comprising:
a first step of solid-state mixing lithium oxide, cobalt oxide and hetero-element oxide to form a mixture; and
a second step of obtaining the lithium transition metal oxide of claim 1 by calcining the mixture obtained in the first step under an inert atmosphere and at a temperature of 550° C. to 750° C.

5. The method for preparing the lithium transition metal oxide of claim 4,
wherein in the second step, the mixture obtained in the first step is heated at a heating rate of 1.4° C./min to 2.0° C./min under an inert atmosphere to perform calcination at a temperature of 550° C. to 750° C. for 2 to 20 hours.

6. A positive electrode additive for a lithium secondary battery, comprising the lithium transition metal oxide of claim 1.

7. A positive electrode for a lithium secondary battery, comprising a positive electrode active material, a binder, a conductive material, and the lithium transition metal oxide of claim 1.

8. A positive electrode for a lithium secondary battery, comprising a positive electrode active material, a binder, a conductive material, and the positive electrode additive for the lithium secondary battery of claim 6.

9. A lithium secondary battery, comprising the positive electrode for the lithium secondary battery of claim 7; a negative electrode; a separator; and an electrolyte.

10. The lithium secondary battery of claim 9,
wherein the negative electrode comprises at least one negative electrode active material selected from the group consisting of a carbonaceous material and a silicon compound.

11. A lithium secondary battery, comprising the positive electrode for the lithium secondary battery of claim 8; a negative electrode; a separator; and an electrolyte.

* * * * *